US008898294B2

(12) United States Patent
Hansen

(10) Patent No.: US 8,898,294 B2
(45) Date of Patent: *Nov. 25, 2014

(54) REPORTING THE STATE OF AN APPARATUS TO A REMOTE COMPUTER

(75) Inventor: James R. Hansen, Franklin, MA (US)

(73) Assignee: Axeda Corporation, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,636

(22) Filed: Oct. 3, 2011

(65) Prior Publication Data

US 2012/0143970 A1    Jun. 7, 2012

Related U.S. Application Data

(63) Continuation of application No. 11/503,638, filed on Aug. 14, 2006, now Pat. No. 8,055,758, which is a continuation of application No. 09/708,384, filed on Nov. 8, 2000, now Pat. No. 7,117,239, which is a continuation-in-part of application No. 09/627,201, filed on Jul. 28, 2000, now Pat. No. 6,757,714.

(51) Int. Cl.
*G06F 15/173* (2006.01)
*G06F 15/16* (2006.01)
*G06F 11/30* (2006.01)
*G06F 11/22* (2006.01)
*G06F 11/07* (2006.01)

(52) U.S. Cl.
CPC ........ *G06F 11/2294* (2013.01); *G06F 11/3058* (2013.01); *G06F 2201/875* (2013.01); *G06F 11/3055* (2013.01); *G06F 11/3086* (2013.01); *G06F 11/0748* (2013.01)
USPC ......................................... 709/224; 709/230

(58) Field of Classification Search
USPC .................... 714/136; 719/318; 709/224, 230
See application file for complete search history.

(56) References Cited

U.S. PATENT DOCUMENTS

| | | |
|---|---|---|
| 4,086,434 A | 4/1978 | Bocchi |
| 4,412,292 A | 10/1983 | Sedam et al. |
| 4,497,037 A | 1/1985 | Kato et al. |
| 4,583,834 A | 4/1986 | Seko et al. |
| 4,853,946 A | 8/1989 | Elliott et al. |
| 4,962,368 A | 10/1990 | Dobrzanski et al. |

(Continued)

FOREIGN PATENT DOCUMENTS

| | | |
|---|---|---|
| EP | 0874306 | 10/1998 |
| EP | 1 191 744 | 3/2002 |

(Continued)

OTHER PUBLICATIONS

"Frequently Asked Questions about the Extensible Markup Language—The XML FAQ" Version 1.41 (http://www.oasis-open.org/cover/xmlFAQ141-19981006.html) (Oct. 6, 1998).

(Continued)

*Primary Examiner* — Brian P Whipple
*Assistant Examiner* — Michael A Chambers
(74) *Attorney, Agent, or Firm* — Fish & Richardson P.C.

(57) ABSTRACT

The state of an apparatus is reported to a remote computer using an embedded device in the apparatus. The embedded device detects the state, generates a message that reports the state using a self-describing computer language, and sends the message to the remote computer. The remote computer receives the message and extracts the state of the embedded device from the message.

31 Claims, 4 Drawing Sheets

(56) References Cited

U.S. PATENT DOCUMENTS

| | | |
|---|---|---|
| 4,964,065 A | 10/1990 | Hicks et al. |
| 4,965,946 A | 10/1990 | Hegedus et al. |
| 4,996,703 A | 2/1991 | Gray |
| 5,038,319 A | 8/1991 | Carter et al. |
| 5,057,866 A | 10/1991 | Hill, Jr. et al. |
| 5,061,837 A | 10/1991 | Gilbert et al. |
| 5,077,582 A | 12/1991 | Kravette et al. |
| 5,084,875 A | 1/1992 | Weinberger et al. |
| 5,129,080 A | 7/1992 | Smith |
| 5,138,377 A | 8/1992 | Smith et al. |
| 5,163,151 A | 11/1992 | Bronikowski et al. |
| 5,184,179 A | 2/1993 | Tarr et al. |
| 5,204,699 A | 4/1993 | Birnbaum et al. |
| 5,212,645 A | 5/1993 | Wildes et al. |
| 5,214,772 A | 5/1993 | Weinberger et al. |
| 5,216,461 A | 6/1993 | Maekawa et al. |
| 5,220,380 A | 6/1993 | Hirata et al. |
| 5,224,157 A | 6/1993 | Yamada et al. |
| 5,243,382 A | 9/1993 | Takano et al. |
| 5,257,069 A | 10/1993 | Hirata et al. |
| 5,261,061 A | 11/1993 | Ju |
| 5,270,775 A | 12/1993 | Suzuki |
| 5,282,127 A | 1/1994 | Mii |
| 5,291,244 A | 3/1994 | Kajiwara et al. |
| 5,293,196 A | 3/1994 | Kaneko et al. |
| 5,297,034 A | 3/1994 | Weinstein |
| 5,297,256 A | 3/1994 | Wolstenholme et al. |
| 5,300,980 A | 4/1994 | Maekawa et al. |
| 5,303,005 A | 4/1994 | Takano et al. |
| 5,305,055 A | 4/1994 | Ebner et al. |
| 5,305,199 A | 4/1994 | LoBiondo et al. |
| 5,307,263 A | 4/1994 | Brown |
| 5,325,156 A | 6/1994 | Ulinski |
| 5,333,286 A | 7/1994 | Weinberger et al. |
| 5,335,048 A | 8/1994 | Takano et al. |
| 5,339,168 A | 8/1994 | Evanitsky et al. |
| 5,342,037 A | 8/1994 | Martin |
| 5,347,346 A | 9/1994 | Shimizu et al. |
| 5,359,391 A | 10/1994 | Kuroyanagi et al. |
| 5,361,265 A | 11/1994 | Weinberger et al. |
| 5,365,310 A | 11/1994 | Jenkins et al. |
| 5,367,667 A | 11/1994 | Wahlquist et al. |
| 5,369,469 A | 11/1994 | Leo et al. |
| 5,369,471 A | 11/1994 | Yamada |
| 5,369,472 A | 11/1994 | Raj et al. |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,430,709 A | 7/1995 | Galloway |
| 5,434,650 A | 7/1995 | Nakahara et al. |
| 5,442,541 A | 8/1995 | Hube et al. |
| 5,444,517 A | 8/1995 | Nagashima |
| 5,444,851 A | 8/1995 | Woest |
| 5,446,522 A | 8/1995 | Tahara et al. |
| 5,452,057 A | 9/1995 | Imaizumi et al. |
| 5,459,552 A | 10/1995 | Ohira |
| 5,463,775 A | 10/1995 | DeWitt et al. |
| 5,469,353 A | 11/1995 | Pinsky et al. |
| 5,485,142 A | 1/1996 | Stute et al. |
| 5,488,454 A | 1/1996 | Fukada et al. |
| 5,491,535 A | 2/1996 | Hirata et al. |
| 5,493,364 A | 2/1996 | Kuroyanagi et al. |
| 5,517,491 A | 5/1996 | Nanni et al. |
| 5,528,691 A | 6/1996 | Rosauer et al. |
| 5,530,899 A | 6/1996 | MacDonald |
| 5,543,892 A | 8/1996 | Hirata et al. |
| 5,548,376 A | 8/1996 | Kikuno |
| 5,550,957 A | 8/1996 | Davidson, Jr. et al. |
| 5,555,191 A | 9/1996 | Hripcsak |
| 5,561,501 A | 10/1996 | Honma |
| 5,572,672 A | 11/1996 | Dewitt et al. |
| 5,579,087 A | 11/1996 | Salgado |
| 5,586,254 A | 12/1996 | Kondo et al. |
| 5,594,529 A | 1/1997 | Yamashita et al. |
| 5,600,301 A | 2/1997 | Robinson, III |
| 5,600,403 A | 2/1997 | Inoo |
| 5,603,060 A | 2/1997 | Weinberger et al. |
| 5,603,323 A | 2/1997 | Pflugrath et al. |
| 5,619,024 A | 4/1997 | Kolls |
| 5,619,716 A | 4/1997 | Nonaka et al. |
| 5,631,724 A | 5/1997 | Sawada et al. |
| 5,636,008 A | 6/1997 | LoBiondo et al. |
| 5,636,333 A | 6/1997 | Davidson, Jr. et al. |
| 5,638,427 A | 6/1997 | Flemming et al. |
| 5,640,495 A | 6/1997 | Colbert et al. |
| 5,642,202 A | 6/1997 | Williams et al. |
| 5,642,208 A | 6/1997 | Takahashi et al. |
| 5,655,084 A | 8/1997 | Pinsky et al. |
| 5,659,794 A | 8/1997 | Caldarale et al. |
| 5,673,190 A | 9/1997 | Kahleck et al. |
| 5,675,744 A | 10/1997 | Tsujii |
| 5,677,775 A | 10/1997 | Yamaguchi et al. |
| 5,694,528 A | 12/1997 | Hube |
| 5,696,903 A | 12/1997 | Mahany |
| 5,699,494 A | 12/1997 | Colbert et al. |
| 5,708,908 A | 1/1998 | Hirata et al. |
| 5,708,909 A | 1/1998 | Yamashita et al. |
| 5,715,393 A | 2/1998 | Naugle |
| 5,715,496 A | 2/1998 | Sawada et al. |
| 5,715,823 A | 2/1998 | Wood et al. |
| 5,720,015 A | 2/1998 | Martin et al. |
| 5,727,135 A | 3/1998 | Webb et al. |
| 5,727,248 A | 3/1998 | Ogura |
| 5,732,212 A | 3/1998 | Perholtz et al. |
| 5,736,965 A | 4/1998 | Mosebrook et al. |
| 5,740,801 A | 4/1998 | Branson |
| 5,745,268 A | 4/1998 | Eastvold et al. |
| 5,748,892 A | 5/1998 | Richardson |
| 5,748,907 A | 5/1998 | Crane |
| 5,752,125 A | 5/1998 | Yamashita et al. |
| 5,752,128 A | 5/1998 | Yamashita |
| 5,752,917 A | 5/1998 | Fuchs |
| 5,761,529 A | 6/1998 | Raji et al. |
| 5,764,918 A | 6/1998 | Poulter |
| 5,768,516 A | 6/1998 | Sugishima |
| 5,772,585 A | 6/1998 | Lavin et al. |
| 5,774,052 A | 6/1998 | Hamm et al. |
| 5,786,994 A | 7/1998 | Friz et al. |
| 5,787,149 A | 7/1998 | Yousefi et al. |
| 5,787,278 A | 7/1998 | Barton et al. |
| 5,790,793 A | 8/1998 | Higley |
| 5,790,977 A | 8/1998 | Exekiel |
| 5,798,738 A | 8/1998 | Yamada |
| 5,801,964 A | 9/1998 | McCarthy |
| 5,809,237 A | 9/1998 | Watts et al. |
| 5,812,397 A | 9/1998 | Pech et al. |
| 5,812,874 A | 9/1998 | Yamashita et al. |
| 5,818,603 A | 10/1998 | Motoyama |
| 5,819,015 A | 10/1998 | Martin et al. |
| 5,819,110 A | 10/1998 | Motoyama |
| 5,822,221 A | 10/1998 | Groenteman |
| 5,826,027 A | 10/1998 | Pedersen et al. |
| 5,828,943 A | 10/1998 | Brown |
| 5,835,816 A | 11/1998 | Sawada et al. |
| 5,835,911 A | 11/1998 | Nakagawa et al. |
| 5,844,550 A | 12/1998 | Trainor et al. |
| 5,845,061 A | 12/1998 | Miyamoto et al. |
| 5,845,230 A | 12/1998 | Lamberson |
| 5,857,207 A | 1/1999 | Lo et al. |
| 5,857,967 A | 1/1999 | Frid et al. |
| 5,862,348 A | 1/1999 | Pedersen |
| 5,862,404 A | 1/1999 | Onaga |
| 5,865,745 A | 2/1999 | Schmitt et al. |
| 5,872,635 A | 2/1999 | Akiyama |
| 5,872,928 A | 2/1999 | Lewis et al. |

(56) References Cited

U.S. PATENT DOCUMENTS

| | | | |
|---|---|---|---|
| 5,873,009 A | 2/1999 | Yamashita et al. |
| 5,873,659 A | 2/1999 | Edwards et al. |
| 5,878,746 A | 3/1999 | Lemelson et al. |
| 5,880,677 A | 3/1999 | Lestician |
| 5,884,072 A | 3/1999 | Rasmussen |
| 5,887,216 A | 3/1999 | Motoyama |
| 5,890,029 A | 3/1999 | Hirata et al. |
| 5,894,416 A | 4/1999 | Kuroyanagi |
| 5,897,235 A | 4/1999 | Honma |
| 5,901,286 A | 5/1999 | Danknick et al. |
| 5,905,906 A | 5/1999 | Goffinet et al. |
| 5,909,493 A | 6/1999 | Motoyama et al. |
| 5,911,095 A | 6/1999 | Atsumi et al. |
| 5,913,060 A | 6/1999 | Discavage |
| 5,917,405 A | 6/1999 | Joao |
| 5,923,842 A | 7/1999 | Pedersen et al. |
| 5,933,675 A | 8/1999 | Sawada et al. |
| 5,935,060 A | 8/1999 | Iliff |
| 5,941,949 A | 8/1999 | Pedersen |
| 5,956,487 A | 9/1999 | Venkatraman et al. |
| 5,956,698 A | 9/1999 | Lachese et al. |
| 5,961,586 A | 10/1999 | Pedersen |
| 5,968,116 A | 10/1999 | Day et al. |
| 5,970,149 A | 10/1999 | Johnson |
| 5,974,234 A | 10/1999 | Levine et al. |
| 5,975,737 A | 11/1999 | Crater et al. |
| 5,991,810 A | 11/1999 | Shapiro et al. |
| 6,003,061 A | 12/1999 | Jones et al. |
| 6,003,070 A | 12/1999 | Frantz |
| 6,003,078 A | 12/1999 | Kodimer et al. |
| 6,006,045 A | 12/1999 | Miyawaki |
| 6,009,274 A | 12/1999 | Fletcher et al. |
| 6,009,284 A | 12/1999 | Weinberger et al. |
| 6,012,088 A | 1/2000 | Li et al. |
| 6,014,631 A | 1/2000 | Teagarden et al. |
| 6,014,691 A | 1/2000 | Brewer et al. |
| 6,014,694 A | 1/2000 | Aharoni et al. |
| 6,016,535 A | 1/2000 | Krantz et al. |
| 6,021,284 A | 2/2000 | Serizawa et al. |
| 6,022,315 A | 2/2000 | Iliff |
| 6,023,223 A | 2/2000 | Baxter, Jr. |
| 6,023,507 A | 2/2000 | Wookey |
| 6,023,721 A | 2/2000 | Cummings |
| 6,023,749 A | 2/2000 | Richardson |
| 6,025,925 A | 2/2000 | Davidson, Jr. et al. |
| 6,031,964 A | 2/2000 | Anderson |
| 6,041,041 A | 3/2000 | Ramanathan et al. |
| 6,042,111 A | 3/2000 | Rivers et al. |
| 6,057,857 A | 5/2000 | Bloomfield |
| 6,060,994 A | 5/2000 | Chen |
| 6,061,603 A | 5/2000 | Papadopolous et al. |
| 6,064,915 A | 5/2000 | Kaneko et al. |
| 6,065,118 A | 5/2000 | Bull et al. |
| 6,081,623 A | 6/2000 | Bloomfield et al. |
| 6,088,718 A | 7/2000 | Altschuler et al. |
| 6,091,915 A | 7/2000 | Takagishi |
| 6,098,116 A | 8/2000 | Nixon et al. |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,118,899 A | 9/2000 | Bloomfield et al. |
| 6,119,934 A | 9/2000 | Kolls |
| 6,122,463 A | 9/2000 | Nagatani |
| 6,125,363 A | 9/2000 | Buzzeo et al. |
| 6,130,999 A | 10/2000 | Serizawa et al. |
| 6,139,177 A | 10/2000 | Venkatraman et al. |
| 6,141,737 A | 10/2000 | Krantz et al. |
| 6,152,365 A | 11/2000 | Kolls |
| 6,157,944 A | 12/2000 | Pedersen |
| 6,161,145 A | 12/2000 | Bainbridge |
| 6,167,432 A | 12/2000 | Jiang |
| 6,167,448 A | 12/2000 | Hemphill et al. |
| 6,172,683 B1 | 1/2001 | Bloomfield |
| 6,175,866 B1 | 1/2001 | Holloway et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,205,466 B1 | 3/2001 | Karp et al. |
| 6,209,048 B1 | 3/2001 | Wolff |
| 6,221,011 B1 | 4/2001 | Bardy |
| 6,226,650 B1 | 5/2001 | Mahajan et al. |
| 6,230,199 B1 | 5/2001 | Revashetti et al. |
| 6,246,485 B1 | 6/2001 | Brown et al. |
| 6,256,378 B1 | 7/2001 | Iggulden et al. |
| 6,256,668 B1 | 7/2001 | Slivka et al. |
| 6,260,148 B1 | 7/2001 | Aggarwal et al. |
| 6,260,248 B1 | 7/2001 | Cramer et al. |
| 6,282,454 B1 | 8/2001 | Papadopolous et al. |
| 6,282,711 B1 | 8/2001 | Halpern et al. |
| 6,286,038 B1 | 9/2001 | Reichmeyer et al. |
| 6,286,059 B1 | 9/2001 | Sugiura |
| 6,289,461 B1 | 9/2001 | Dixon |
| 6,292,828 B1 | 9/2001 | Williams |
| 6,295,527 B1 | 9/2001 | McCormack et al. |
| 6,298,457 B1 | 10/2001 | Rachlin et al. |
| 6,304,895 B1 | 10/2001 | Schneider et al. |
| 6,307,570 B1 | 10/2001 | Stergiades |
| 6,308,099 B1 | 10/2001 | Fox et al. |
| 6,311,024 B1 | 10/2001 | Serizawa et al. |
| 6,312,378 B1 | 11/2001 | Bardy |
| 6,317,570 B1 | 11/2001 | Uchida et al. |
| 6,317,783 B1 | 11/2001 | Freishtat et al. |
| 6,317,848 B1 | 11/2001 | Sorens et al. |
| 6,325,540 B1 | 12/2001 | Lounsberry et al. |
| 6,327,594 B1 | 12/2001 | Van Huben et al. |
| 6,336,135 B1 | 1/2002 | Niblett et al. |
| 6,338,086 B1 | 1/2002 | Curtis et al. |
| 6,343,320 B1 | 1/2002 | Fairchild et al. |
| 6,356,933 B2 | 3/2002 | Mitchell et al. |
| 6,356,949 B1 | 3/2002 | Katsandres et al. |
| 6,366,741 B1 | 4/2002 | Fukushima |
| 6,368,284 B1 | 4/2002 | Bardy |
| 6,370,436 B1 * | 4/2002 | Howard et al. ............ 700/2 |
| 6,370,552 B1 | 4/2002 | Bloomfield |
| 6,370,570 B1 | 4/2002 | Muir et al. |
| 6,370,582 B1 | 4/2002 | Lim et al. |
| 6,377,162 B1 | 4/2002 | Delestienne et al. |
| 6,377,971 B1 | 4/2002 | Madden et al. |
| 6,381,557 B1 | 4/2002 | Babula et al. |
| 6,381,712 B1 * | 4/2002 | Nemitz ............ 714/57 |
| 6,397,212 B1 | 5/2002 | Biffar |
| 6,401,116 B1 | 6/2002 | Okigami |
| 6,405,310 B1 | 6/2002 | Simpson |
| 6,406,426 B1 | 6/2002 | Reuss et al. |
| 6,412,026 B1 | 6/2002 | Graf |
| 6,415,023 B2 | 7/2002 | Iggulden |
| 6,415,392 B1 | 7/2002 | Suzuki et al. |
| 6,421,671 B1 | 7/2002 | Bryan et al. |
| 6,426,798 B1 | 7/2002 | Yeung |
| 6,430,612 B1 | 8/2002 | Iizuka |
| 6,430,711 B1 | 8/2002 | Sekizawa |
| 6,434,572 B2 | 8/2002 | Derzay et al. |
| 6,437,692 B1 | 8/2002 | Petite et al. |
| 6,437,803 B1 | 8/2002 | Panasyuk et al. |
| 6,438,598 B1 | 8/2002 | Pedersen |
| 6,446,192 B1 | 9/2002 | Narasimhan et al. |
| 6,449,633 B1 | 9/2002 | Van et al. |
| 6,449,663 B1 | 9/2002 | Carney et al. |
| 6,453,127 B2 | 9/2002 | Wood et al. |
| 6,453,129 B1 | 9/2002 | Simpson et al. |
| 6,457,038 B1 | 9/2002 | Defosse |
| 6,462,831 B1 | 10/2002 | Akiyama |
| 6,466,971 B1 | 10/2002 | Humpleman et al. |
| 6,467,084 B1 * | 10/2002 | Howard et al. ............ 717/136 |
| 6,471,521 B1 | 10/2002 | Dornbush et al. |
| 6,477,117 B1 | 11/2002 | Narayanaswami et al. |
| 6,479,792 B1 | 11/2002 | Beiermann et al. |
| 6,487,513 B1 | 11/2002 | Eastvold et al. |
| 6,493,517 B1 | 12/2002 | Hanson |
| 6,493,871 B1 | 12/2002 | McGuire et al. |
| 6,494,831 B1 | 12/2002 | Koritzinsky |
| 6,510,350 B1 | 1/2003 | Steen, III et al. |

(56) References Cited

U.S. PATENT DOCUMENTS

| | | |
|---|---|---|
| 6,523,013 B2 | 2/2003 | Shah et al. |
| 6,523,063 B1 | 2/2003 | Miller et al. |
| 6,523,130 B1 | 2/2003 | Hickman et al. |
| 6,529,848 B2 | 3/2003 | Sone |
| 6,538,667 B1 | 3/2003 | Duursma et al. |
| 6,549,612 B2 | 4/2003 | Gifford et al. |
| 6,553,336 B1 | 4/2003 | Johnson et al. |
| 6,553,490 B1 | 4/2003 | Kottapurath et al. |
| 6,559,965 B1 | 5/2003 | Simpson et al. |
| 6,560,611 B1 | 5/2003 | Nine et al. |
| 6,560,641 B1 | 5/2003 | Powderly et al. |
| 6,560,656 B1 | 5/2003 | O'Sullivan et al. |
| 6,564,227 B2 | 5/2003 | Sakakibara et al. |
| 6,567,813 B1 | 5/2003 | Zhu et al. |
| 6,574,729 B1 | 6/2003 | Fink et al. |
| 6,581,092 B1 | 6/2003 | Motoyama et al. |
| 6,581,094 B1 | 6/2003 | Gao |
| 6,587,812 B1 | 7/2003 | Takayama |
| 6,587,879 B1 | 7/2003 | Reynolds |
| 6,591,272 B1 | 7/2003 | Williams |
| 6,598,011 B1 | 7/2003 | Howards Koritzinsky et al. |
| 6,598,083 B1 * | 7/2003 | Remer et al. ............ 709/229 |
| 6,601,087 B1 | 7/2003 | Zhu et al. |
| 6,601,159 B1 | 7/2003 | Smith et al. |
| 6,604,212 B2 | 8/2003 | Sekizawa et al. |
| 6,609,108 B1 | 8/2003 | Pulliam et al. |
| 6,611,863 B1 | 8/2003 | Banginwar |
| 6,631,407 B1 | 10/2003 | Mukaiyama et al. |
| 6,636,899 B1 | 10/2003 | Rabb et al. |
| 6,643,650 B1 | 11/2003 | Slaughter et al. |
| 6,643,690 B2 | 11/2003 | Duursma et al. |
| 6,646,655 B1 | 11/2003 | Brandt et al. |
| 6,651,110 B1 | 11/2003 | Caspers et al. |
| 6,651,190 B1 | 11/2003 | Worley et al. |
| 6,654,032 B1 | 11/2003 | Zhu et al. |
| 6,654,720 B1 | 11/2003 | Graham et al. |
| 6,654,726 B1 | 11/2003 | Hanzek |
| 6,665,425 B1 | 12/2003 | Sampath et al. |
| 6,670,810 B2 | 12/2003 | Duncan et al. |
| 6,671,695 B2 | 12/2003 | McFadden |
| 6,681,344 B1 | 1/2004 | Andrew |
| 6,681,349 B2 | 1/2004 | Sekizawa |
| 6,684,259 B1 | 1/2004 | Discavage et al. |
| 6,686,838 B1 | 2/2004 | Rezvani et al. |
| 6,687,848 B1 | 2/2004 | Najmi |
| 6,687,873 B1 | 2/2004 | Ballantyne et al. |
| 6,691,106 B1 | 2/2004 | Sathyanarayan |
| 6,691,154 B1 | 2/2004 | Zhu et al. |
| 6,691,157 B2 | 2/2004 | Muir et al. |
| 6,704,807 B1 | 3/2004 | Mathur et al. |
| 6,710,893 B1 | 3/2004 | Hou et al. |
| 6,711,593 B1 | 3/2004 | Gordon et al. |
| 6,711,618 B1 | 3/2004 | Danner et al. |
| 6,717,513 B1 | 4/2004 | Sandelman et al. |
| 6,725,281 B1 * | 4/2004 | Zintel et al. ............ 719/318 |
| 6,738,798 B1 | 5/2004 | Ploetz et al. |
| 6,754,664 B1 | 6/2004 | Bush |
| 6,757,714 B1 | 6/2004 | Hansen |
| 6,757,899 B2 | 6/2004 | Zdankin et al. |
| 6,763,274 B1 | 7/2004 | Gilbert |
| 6,763,501 B1 | 7/2004 | Zhu et al. |
| 6,766,333 B1 | 7/2004 | Wu et al. |
| 6,775,238 B1 | 8/2004 | Suzuki et al. |
| 6,779,004 B1 | 8/2004 | Zintel |
| 6,782,542 B1 | 8/2004 | Mein et al. |
| 6,785,015 B1 | 8/2004 | Smith et al. |
| 6,785,713 B1 | 8/2004 | Freeman et al. |
| 6,785,726 B1 | 8/2004 | Freeman et al. |
| 6,789,112 B1 | 9/2004 | Freeman et al. |
| 6,789,119 B1 | 9/2004 | Zhu et al. |
| 6,792,337 B2 | 9/2004 | Blackett et al. |
| 6,799,209 B1 | 9/2004 | Hayton |
| 6,799,270 B1 | 9/2004 | Bull et al. |
| RE38,609 E | 10/2004 | Chen et al. |
| 6,804,712 B1 | 10/2004 | Kracht |
| 6,807,580 B2 | 10/2004 | Freeman et al. |
| 6,810,488 B2 | 10/2004 | Teng |
| 6,816,616 B2 | 11/2004 | Teng |
| 6,823,397 B2 | 11/2004 | Rawson, III |
| 6,826,606 B2 | 11/2004 | Freeman et al. |
| 6,831,555 B1 | 12/2004 | Miller et al. |
| 6,832,239 B1 | 12/2004 | Kraft et al. |
| 6,832,373 B2 | 12/2004 | O'Neill |
| 6,834,298 B1 | 12/2004 | Singer et al. |
| 6,842,903 B1 | 1/2005 | Weschler |
| 6,857,013 B2 | 2/2005 | Ramberg et al. |
| 6,886,046 B2 | 4/2005 | Stutz et al. |
| 6,891,830 B2 | 5/2005 | Curtis |
| 6,901,448 B2 | 5/2005 | Zhu et al. |
| 6,904,593 B1 | 6/2005 | Fong et al. |
| 6,920,480 B2 | 7/2005 | Mitchell et al. |
| 6,922,724 B1 | 7/2005 | Freeman et al. |
| 6,925,335 B2 | 8/2005 | May et al. |
| 6,925,645 B2 | 8/2005 | Zhu et al. |
| 6,928,469 B1 | 8/2005 | Duursma et al. |
| 6,940,405 B2 | 9/2005 | Script et al. |
| 6,950,991 B2 | 9/2005 | Bloomfield et al. |
| 6,952,714 B2 | 10/2005 | Peart |
| 6,963,899 B1 | 11/2005 | Fernandez et al. |
| 6,972,676 B1 | 12/2005 | Kimmel et al. |
| 6,983,020 B2 | 1/2006 | Christiansen |
| 6,985,779 B2 | 1/2006 | Hsiung et al. |
| 6,986,040 B1 | 1/2006 | Kramer et al. |
| 6,990,395 B2 | 1/2006 | Ransom et al. |
| 7,003,574 B1 | 2/2006 | Bahl |
| 7,016,966 B1 * | 3/2006 | Saulpaugh et al. ........... 709/230 |
| 7,020,706 B2 | 3/2006 | Cates et al. |
| 7,020,773 B1 | 3/2006 | Otway et al. |
| 7,028,025 B2 | 4/2006 | Collins |
| 7,028,081 B2 | 4/2006 | Kawashima |
| 7,028,312 B1 * | 4/2006 | Merrick et al. ............ 719/330 |
| 7,031,342 B2 | 4/2006 | Teng |
| 7,032,005 B2 | 4/2006 | Mathon et al. |
| 7,043,677 B1 | 5/2006 | Li |
| 7,046,134 B2 | 5/2006 | Hansen |
| 7,051,084 B1 | 5/2006 | Hayton et al. |
| 7,057,724 B1 | 6/2006 | Mead et al. |
| 7,065,576 B2 | 6/2006 | Kamel et al. |
| 7,069,298 B2 | 6/2006 | Zhu et al. |
| 7,072,946 B2 | 7/2006 | Shafer |
| 7,079,010 B2 | 7/2006 | Champlin |
| 7,080,267 B2 | 7/2006 | Gary et al. |
| 7,082,426 B2 | 7/2006 | Musgrove et al. |
| 7,082,460 B2 | 7/2006 | Hansen et al. |
| 7,085,814 B1 * | 8/2006 | Gandhi et al. ............ 709/208 |
| 7,085,824 B2 | 8/2006 | Forth et al. |
| 7,089,567 B2 | 8/2006 | Giradot et al. |
| 7,091,846 B2 | 8/2006 | Wu |
| 7,092,370 B2 | 8/2006 | Jiang et al. |
| 7,099,110 B2 | 8/2006 | Detzler |
| 7,100,200 B2 | 8/2006 | Pope et al. |
| 7,103,357 B2 | 9/2006 | Kirani et al. |
| 7,103,799 B2 | 9/2006 | Dixon |
| 7,113,988 B2 | 9/2006 | Chirashnya et al. |
| 7,116,681 B1 | 10/2006 | Hovell et al. |
| 7,117,239 B1 | 10/2006 | Hansen |
| 7,117,243 B2 | 10/2006 | Peart |
| 7,127,525 B2 | 10/2006 | Coleman et al. |
| 7,130,883 B2 | 10/2006 | Zhu et al. |
| 7,142,839 B2 | 11/2006 | Pelaez et al. |
| 7,149,792 B1 | 12/2006 | Hansen |
| 7,158,483 B1 | 1/2007 | Takabatake et al. |
| 7,162,315 B2 | 1/2007 | Gilbert |
| 7,162,628 B2 | 1/2007 | Gentil et al. |
| 7,178,149 B2 | 2/2007 | Hansen |
| 7,185,014 B1 | 2/2007 | Hansen |
| 7,194,743 B2 | 3/2007 | Hayton et al. |
| 7,200,578 B2 * | 4/2007 | Paltenghe et al. ............ 705/74 |
| 7,203,755 B2 | 4/2007 | Zhu et al. |
| 7,213,051 B2 | 5/2007 | Zhu et al. |
| 7,216,172 B2 | 5/2007 | Yang et al. |
| 7,234,943 B1 | 6/2007 | Aleali |
| 7,254,601 B2 | 8/2007 | Baller et al. |
| 7,266,526 B1 | 9/2007 | Drummond et al. |

(56) References Cited

U.S. PATENT DOCUMENTS

| | | |
|---|---|---|
| 7,290,061 B2 | 10/2007 | Lentini et al. |
| 7,293,176 B2 | 11/2007 | Otway et al. |
| 7,330,872 B2 | 2/2008 | Peart et al. |
| 7,334,119 B2 | 2/2008 | Gentil et al. |
| 7,340,772 B2 | 3/2008 | Panasyuk et al. |
| 7,346,842 B1 | 3/2008 | Hayton et al. |
| 7,353,253 B1 | 4/2008 | Zhao |
| 7,359,953 B2 | 4/2008 | Muir et al. |
| 7,376,695 B2 | 5/2008 | Duursma et al. |
| 7,421,484 B2 | 9/2008 | Das |
| 7,444,071 B2 | 10/2008 | Chen |
| 7,453,379 B2 | 11/2008 | Plamondon |
| 7,460,038 B2 | 12/2008 | Samuels et al. |
| 7,490,166 B2 | 2/2009 | Yang et al. |
| 7,496,097 B2 | 2/2009 | Rao et al. |
| 7,502,726 B2 | 3/2009 | Panasyuk et al. |
| 7,502,784 B2 | 3/2009 | Collins |
| 7,506,048 B1 * | 3/2009 | Motoyama .................... 709/224 |
| 7,529,767 B2 | 5/2009 | DeAnna et al. |
| 7,532,134 B2 | 5/2009 | Samuels et al. |
| 7,542,471 B2 | 6/2009 | Samuels et al. |
| 7,555,529 B2 | 6/2009 | Bloomfield et al. |
| 7,562,121 B2 | 7/2009 | Berisford |
| 7,562,146 B2 | 7/2009 | Panasyuk et al. |
| 7,562,226 B2 | 7/2009 | Aiken et al. |
| 7,565,526 B1 | 7/2009 | Shaw et al. |
| 7,581,005 B2 | 8/2009 | Montemayor et al. |
| 7,584,294 B2 | 9/2009 | Plamondon |
| 7,587,755 B2 | 9/2009 | Kramer |
| 7,593,514 B1 | 9/2009 | Zhuang et al. |
| 7,594,018 B2 | 9/2009 | Pedersen |
| 7,596,593 B2 | 9/2009 | Mitchell et al. |
| 7,606,902 B2 | 10/2009 | Rao et al. |
| 7,609,721 B2 | 10/2009 | Rao et al. |
| 7,613,131 B2 | 11/2009 | Decasper et al. |
| 7,617,531 B1 | 11/2009 | Chauhan et al. |
| 7,619,545 B2 | 11/2009 | Samuels et al. |
| 7,656,799 B2 | 2/2010 | Samuels et al. |
| 7,657,657 B2 | 2/2010 | Rao et al. |
| 7,661,129 B2 | 2/2010 | Panasyuk et al. |
| 7,661,131 B1 | 2/2010 | Shaw et al. |
| 7,664,857 B2 | 2/2010 | Ovsiannikov et al. |
| 7,676,813 B2 | 3/2010 | Bisset et al. |
| 7,937,370 B2 | 5/2011 | Hansen |
| 7,966,418 B2 | 6/2011 | Shedrinsky |
| 8,055,758 B2 | 11/2011 | Hansen |
| 8,060,886 B2 | 11/2011 | Hansen |
| 8,108,543 B2 | 1/2012 | Hansen |
| 8,291,039 B2 | 10/2012 | Shedrinsky |
| 8,301,587 B2 | 10/2012 | Singh |
| 8,762,497 B2 | 6/2014 | Hansen |
| 2001/0007117 A1 | 7/2001 | Cooper et al. |
| 2001/0011250 A1 * | 8/2001 | Paltenghe et al. ................ 705/41 |
| 2001/0025377 A1 | 9/2001 | Hinderks |
| 2001/0027439 A1 | 10/2001 | Holtzman et al. |
| 2001/0049690 A1 * | 12/2001 | McConnell et al. ....... 707/104.1 |
| 2001/0049717 A1 | 12/2001 | Freeman et al. |
| 2001/0052999 A1 | 12/2001 | Hiraoka et al. |
| 2001/0056547 A1 | 12/2001 | Dixon |
| 2002/0006790 A1 | 1/2002 | Blumeenstock et al. |
| 2002/0019844 A1 | 2/2002 | Kurowski et al. |
| 2002/0026514 A1 | 2/2002 | Ellis et al. |
| 2002/0032470 A1 | 3/2002 | Linberg |
| 2002/0032720 A1 | 3/2002 | Nelson et al. |
| 2002/0035533 A1 | 3/2002 | Mache et al. |
| 2002/0038320 A1 | 3/2002 | Brook |
| 2002/0052932 A1 | 5/2002 | Curtis et al. |
| 2002/0054169 A1 | 5/2002 | Richardson |
| 2002/0059489 A1 | 5/2002 | Davis et al. |
| 2002/0064138 A1 | 5/2002 | Saito et al. |
| 2002/0078135 A1 | 6/2002 | Venkatsubra |
| 2002/0078259 A1 | 6/2002 | Wendorf et al. |
| 2002/0080391 A1 | 6/2002 | Sugiura et al. |
| 2002/0095600 A1 | 7/2002 | Deen |
| 2002/0116550 A1 | 8/2002 | Hansen |
| 2002/0133753 A1 | 9/2002 | Mayberry et al. |
| 2002/0135801 A1 | 9/2002 | Tessman |
| 2002/0138567 A1 | 9/2002 | Ogawa |
| 2002/0144016 A1 | 10/2002 | Spicer et al. |
| 2002/0157090 A1 | 10/2002 | Anton, Jr. |
| 2002/0174085 A1 | 11/2002 | Nelson et al. |
| 2002/0178241 A1 | 11/2002 | Eriksson |
| 2002/0191612 A1 | 12/2002 | Curtis |
| 2003/0014733 A1 | 1/2003 | Ringseth et al. |
| 2003/0023957 A1 | 1/2003 | Bau et al. |
| 2003/0025931 A1 | 2/2003 | Dorfman et al. |
| 2003/0037148 A1 | 2/2003 | Pedersen |
| 2003/0056140 A1 | 3/2003 | Taylor et al. |
| 2003/0061403 A1 | 3/2003 | Miyata et al. |
| 2003/0063119 A1 | 4/2003 | Bloomfield et al. |
| 2003/0063309 A1 | 4/2003 | Parry |
| 2003/0070006 A1 | 4/2003 | Nadler et al. |
| 2003/0072027 A1 | 4/2003 | Haines et al. |
| 2003/0118353 A1 | 6/2003 | Baller |
| 2003/0136837 A1 | 7/2003 | Amon et al. |
| 2003/0140234 A1 | 7/2003 | Noda et al. |
| 2003/0154284 A1 | 8/2003 | Bernardin et al. |
| 2003/0158897 A1 | 8/2003 | Ben-Natan et al. |
| 2003/0158919 A1 | 8/2003 | Fomenko |
| 2003/0163569 A1 | 8/2003 | Panasyuk et al. |
| 2003/0177172 A1 | 9/2003 | Duursma et al. |
| 2003/0182375 A1 | 9/2003 | Zhu |
| 2003/0200285 A1 | 10/2003 | Hansen et al. |
| 2003/0200329 A1 | 10/2003 | Delaney |
| 2003/0229529 A1 | 12/2003 | Mui et al. |
| 2003/0229785 A1 | 12/2003 | Daseke et al. |
| 2004/0027376 A1 | 2/2004 | Calder et al. |
| 2004/0098515 A1 | 5/2004 | Rezvani et al. |
| 2004/0128370 A1 | 7/2004 | Kortright |
| 2004/0139309 A1 | 7/2004 | Gentil et al. |
| 2004/0152450 A1 | 8/2004 | Brasher et al. |
| 2004/0158630 A1 | 8/2004 | Chang et al. |
| 2004/0158631 A1 | 8/2004 | Chang et al. |
| 2004/0177124 A1 | 9/2004 | Hansen |
| 2004/0186693 A1 | 9/2004 | Xiang et al. |
| 2004/0215605 A1 | 10/2004 | Mester |
| 2004/0221026 A1 | 11/2004 | Dorland |
| 2004/0252628 A1 | 12/2004 | Detzler |
| 2004/0260801 A1 | 12/2004 | Li |
| 2005/0005152 A1 | 1/2005 | Singh et al. |
| 2005/0015501 A1 | 1/2005 | Kaplan et al. |
| 2005/0021772 A1 | 1/2005 | Shedrinski |
| 2005/0033588 A1 | 2/2005 | Ruiz et al. |
| 2005/0055397 A1 | 3/2005 | Zhu et al. |
| 2005/0080897 A1 | 4/2005 | Braun et al. |
| 2005/0086172 A1 | 4/2005 | Stefik |
| 2005/0102388 A1 | 5/2005 | Tabbara et al. |
| 2005/0119930 A1 | 6/2005 | Simon |
| 2005/0141507 A1 | 6/2005 | Curtis |
| 2005/0144612 A1 | 6/2005 | Wang et al. |
| 2005/0154787 A1 | 7/2005 | Cochran et al. |
| 2005/0190769 A1 | 9/2005 | Smith |
| 2005/0193099 A1 | 9/2005 | Reus et al. |
| 2005/0193386 A1 | 9/2005 | McCaleb et al. |
| 2005/0196023 A1 | 9/2005 | Chen et al. |
| 2005/0198189 A1 | 9/2005 | Robinson et al. |
| 2005/0198245 A1 | 9/2005 | Burgess et al. |
| 2005/0198292 A1 | 9/2005 | Duursma et al. |
| 2005/0198379 A1 | 9/2005 | Panasyuk et al. |
| 2005/0198380 A1 | 9/2005 | Panasyuk et al. |
| 2005/0198393 A1 | 9/2005 | Stutz et al. |
| 2005/0232168 A1 | 10/2005 | Schauser et al. |
| 2005/0235014 A1 | 10/2005 | Schauser et al. |
| 2005/0246445 A1 | 11/2005 | Panasyuk et al. |
| 2005/0246702 A1 | 11/2005 | Yeh et al. |
| 2005/0251551 A1 | 11/2005 | Mitchell et al. |
| 2005/0256614 A1 | 11/2005 | Habermas |
| 2005/0256923 A1 | 11/2005 | Adachi |
| 2005/0262076 A1 | 11/2005 | Voskuil |
| 2005/0267974 A1 | 12/2005 | Panasyuk et al. |
| 2005/0273513 A1 | 12/2005 | Panasyuk et al. |
| 2006/0002315 A1 | 1/2006 | Theurer et al. |
| 2006/0015740 A1 | 1/2006 | Kramer |
| 2006/0029062 A1 | 2/2006 | Rao et al. |

(56) References Cited

U.S. PATENT DOCUMENTS

| | | |
|---|---|---|
| 2006/0029063 A1 | 2/2006 | Rao et al. |
| 2006/0029064 A1 | 2/2006 | Rao et al. |
| 2006/0031237 A1 | 2/2006 | DeAnna et al. |
| 2006/0031476 A1 | 2/2006 | Mathes et al. |
| 2006/0031779 A1 | 2/2006 | Theurer et al. |
| 2006/0037022 A1 | 2/2006 | Byrd et al. |
| 2006/0037071 A1 | 2/2006 | Rao et al. |
| 2006/0037072 A1 | 2/2006 | Rao et al. |
| 2006/0039354 A1 | 2/2006 | Rao et al. |
| 2006/0039355 A1 | 2/2006 | Rao et al. |
| 2006/0039356 A1 | 2/2006 | Rao et al. |
| 2006/0039404 A1 | 2/2006 | Rao et al. |
| 2006/0047956 A1 | 3/2006 | Calvin |
| 2006/0059239 A1 | 3/2006 | Brasher et al. |
| 2006/0066448 A1 | 3/2006 | Berisford et al. |
| 2006/0069668 A1 | 3/2006 | Braddy et al. |
| 2006/0069683 A1 | 3/2006 | Braddy et al. |
| 2006/0069750 A1 | 3/2006 | Momtchilov et al. |
| 2006/0069753 A1 | 3/2006 | Hu et al. |
| 2006/0070029 A1 | 3/2006 | Laborczfalvi et al. |
| 2006/0070090 A1 | 3/2006 | Gulkis |
| 2006/0070131 A1 | 3/2006 | Braddy et al. |
| 2006/0074837 A1 | 4/2006 | Braddy et al. |
| 2006/0075080 A1 | 4/2006 | Burr et al. |
| 2006/0075114 A1 | 4/2006 | Panasyuk et al. |
| 2006/0075123 A1 | 4/2006 | Burr et al. |
| 2006/0075381 A1 | 4/2006 | Laborczfalvi et al. |
| 2006/0075463 A1 | 4/2006 | Braddy et al. |
| 2006/0077941 A1 | 4/2006 | Alagappan et al. |
| 2006/0087408 A1 | 4/2006 | Korzeniowski |
| 2006/0087409 A1 | 4/2006 | Korzeniowski |
| 2006/0090171 A1 | 4/2006 | Laborczfalvi et al. |
| 2006/0095334 A1 | 5/2006 | Simmons |
| 2006/0095370 A1 | 5/2006 | Seth et al. |
| 2006/0100972 A1 | 5/2006 | Chianese et al. |
| 2006/0135192 A1 | 6/2006 | Surendra et al. |
| 2006/0150249 A1 | 7/2006 | Gassen et al. |
| 2006/0159080 A1 | 7/2006 | Mazzaferri et al. |
| 2006/0159432 A1 | 7/2006 | Mazzaferri et al. |
| 2006/0161555 A1 | 7/2006 | Mazzaferri et al. |
| 2006/0161671 A1 | 7/2006 | Ryman et al. |
| 2006/0161783 A1 | 7/2006 | Aiken et al. |
| 2006/0161959 A1 | 7/2006 | Ryman et al. |
| 2006/0161974 A1 | 7/2006 | Innes et al. |
| 2006/0179143 A1 | 8/2006 | Walker et al. |
| 2006/0184614 A1 | 8/2006 | Baratto et al. |
| 2006/0190719 A1 | 8/2006 | Rao et al. |
| 2006/0200307 A1 | 9/2006 | Riess |
| 2006/0200494 A1 | 9/2006 | Sparks |
| 2006/0203007 A1 | 9/2006 | Bullard et al. |
| 2006/0206820 A1 | 9/2006 | Bullard et al. |
| 2006/0224742 A1 | 10/2006 | Shabazi et al. |
| 2006/0236325 A1 | 10/2006 | Rao et al. |
| 2006/0236385 A1 | 10/2006 | Innes et al. |
| 2006/0242415 A1 | 10/2006 | Gaylor |
| 2006/0247502 A1 | 11/2006 | Chen |
| 2006/0248144 A1 | 11/2006 | Zhu et al. |
| 2006/0271875 A1 | 11/2006 | Green et al. |
| 2006/0271877 A1 | 11/2006 | Theurer et al. |
| 2006/0282521 A1 | 12/2006 | Anderson et al. |
| 2007/0005736 A1 | 1/2007 | Hansen |
| 2007/0011295 A1 | 1/2007 | Hansen |
| 2007/0011356 A1 | 1/2007 | Schauser et al. |
| 2007/0022159 A1 | 1/2007 | Zhu |
| 2007/0056009 A1 | 3/2007 | Spilo et al. |
| 2007/0077917 A1 | 4/2007 | Kim |
| 2007/0078976 A1 | 4/2007 | Taylor et al. |
| 2007/0088826 A1 | 4/2007 | Raphel et al. |
| 2007/0094076 A1 | 4/2007 | Perkowski et al. |
| 2007/0094672 A1 | 4/2007 | Hayton et al. |
| 2007/0100892 A1 | 5/2007 | Kephart et al. |
| 2007/0106810 A1 | 5/2007 | Ryman |
| 2007/0106811 A1 | 5/2007 | Ryman |
| 2007/0113069 A1 | 5/2007 | Gentil et al. |
| 2007/0130167 A1 | 6/2007 | Day et al. |
| 2007/0130337 A1 | 6/2007 | Arnison |
| 2007/0143837 A1 | 6/2007 | Azeez et al. |
| 2007/0150903 A1 | 6/2007 | Hansen |
| 2007/0156810 A1 | 7/2007 | Kumar |
| 2007/0156923 A1 | 7/2007 | Kumar |
| 2007/0157101 A1 | 7/2007 | Indiran et al. |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0174454 A1 | 7/2007 | Mitchell et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0198661 A1 | 8/2007 | Hansen |
| 2007/0203952 A1 | 8/2007 | Baron et al. |
| 2007/0239886 A1 | 10/2007 | Montemayor et al. |
| 2007/0271599 A1 | 11/2007 | Rosenstein |
| 2007/0282623 A1 | 12/2007 | Dattorro |
| 2007/0288629 A2 | 12/2007 | Taylor et al. |
| 2007/0294237 A1 | 12/2007 | John et al. |
| 2008/0005321 A1 | 1/2008 | Ma et al. |
| 2008/0031235 A1 | 2/2008 | Harris et al. |
| 2008/0034057 A1 | 2/2008 | Kumar et al. |
| 2008/0034072 A1 | 2/2008 | He et al. |
| 2008/0034110 A1 | 2/2008 | Suganthi et al. |
| 2008/0034111 A1 | 2/2008 | Kamath et al. |
| 2008/0034119 A1 | 2/2008 | Verzunov et al. |
| 2008/0034410 A1 | 2/2008 | Udupa et al. |
| 2008/0034413 A1 | 2/2008 | He et al. |
| 2008/0034418 A1 | 2/2008 | Venkatraman et al. |
| 2008/0034419 A1 | 2/2008 | Mullick et al. |
| 2008/0043617 A1 | 2/2008 | Schekochikhin et al. |
| 2008/0043622 A1 | 2/2008 | Kamath et al. |
| 2008/0043749 A1 | 2/2008 | Suganthi et al. |
| 2008/0043760 A1 | 2/2008 | Venkatraman et al. |
| 2008/0043761 A1 | 2/2008 | Kumar et al. |
| 2008/0046371 A1 | 2/2008 | He et al. |
| 2008/0046616 A1 | 2/2008 | Verzunov et al. |
| 2008/0046714 A1 | 2/2008 | Suganthi et al. |
| 2008/0046717 A1 | 2/2008 | Kanekar et al. |
| 2008/0046727 A1 | 2/2008 | Kanekar et al. |
| 2008/0046994 A1 | 2/2008 | Venkatraman et al. |
| 2008/0049616 A1 | 2/2008 | Kamath et al. |
| 2008/0065757 A1 | 3/2008 | Motoyama et al. |
| 2008/0068289 A1 | 3/2008 | Piasecki |
| 2008/0068290 A1 | 3/2008 | Muklashy et al. |
| 2008/0069005 A1 | 3/2008 | von Eicken et al. |
| 2008/0069104 A1 | 3/2008 | von Eicken et al. |
| 2008/0071905 A1 | 3/2008 | Sullivan et al. |
| 2008/0082657 A1 | 4/2008 | Hart et al. |
| 2008/0109912 A1 | 5/2008 | Rivera |
| 2008/0126978 A1 | 5/2008 | Bai et al. |
| 2008/0154957 A1 | 6/2008 | Taylor et al. |
| 2008/0201405 A1 | 8/2008 | Duursma et al. |
| 2008/0208605 A1 | 8/2008 | Sinha et al. |
| 2008/0219122 A1 | 9/2008 | Detzler et al. |
| 2008/0231414 A1 | 9/2008 | Canosa |
| 2008/0250110 A1 | 10/2008 | Zhao |
| 2009/0013064 A1 | 1/2009 | Taylor et al. |
| 2009/0019226 A1 | 1/2009 | Edwards et al. |
| 2009/0055745 A1 | 2/2009 | Christiansen |
| 2009/0064134 A1 | 3/2009 | Cox |
| 2009/0099836 A1 | 4/2009 | Jacobsen et al. |
| 2009/0100349 A1 | 4/2009 | Hancock et al. |
| 2009/0106347 A1 | 4/2009 | Harwood et al. |
| 2009/0117890 A1 | 5/2009 | Jacobsen et al. |
| 2009/0119408 A1 | 5/2009 | Teze et al. |
| 2009/0187654 A1 | 7/2009 | Raja et al. |
| 2009/0234972 A1 | 9/2009 | Raghu et al. |
| 2009/0259728 A1 | 10/2009 | Berisford et al. |
| 2012/0143970 A1 | 6/2012 | Hansen |

(56) References Cited

U.S. PATENT DOCUMENTS

| | | | |
|---|---|---|---|
| 2012/0158914 A1 | 6/2012 | Hansen | |
| 2012/0158982 A1 | 6/2012 | Hansen | |
| 2013/0067031 A1 | 3/2013 | Shedrinsky | |

FOREIGN PATENT DOCUMENTS

| | | | |
|---|---|---|---|
| EP | 1319212 | | 6/2003 |
| EP | 1 362 282 | | 11/2003 |
| EP | 1 695 485 | | 8/2006 |
| EP | 1305712 | | 9/2006 |
| EP | 1504371 | | 2/2008 |
| FR | 2797728 | | 2/2001 |
| GB | 2305820 | | 4/1997 |
| JP | 60-263162 | | 12/1985 |
| JP | 64061842 | A | 3/1989 |
| JP | 06-062130 | | 3/1994 |
| JP | 07-325513 | | 12/1995 |
| JP | 09-163008 | | 6/1997 |
| JP | 09-305407 | | 11/1997 |
| JP | 09-325925 | | 12/1997 |
| JP | 10-190922 | | 7/1998 |
| JP | 10-224372 | | 8/1998 |
| JP | 11-045195 | | 2/1999 |
| JP | 64-061842 | | 4/1999 |
| JP | 11-167540 | | 6/1999 |
| JP | 11167540 | A | 6/1999 |
| JP | 11-203079 | | 7/1999 |
| JP | 11-234271 | | 8/1999 |
| JP | 11-238043 | | 8/1999 |
| JP | 11234271 | | 8/1999 |
| JP | 11238043 | A | 8/1999 |
| JP | 11-296453 | | 10/1999 |
| JP | 10-295788 | | 4/2000 |
| JP | 2000-112863 | | 4/2000 |
| JP | 2000-122952 | | 4/2000 |
| JP | 200122952 | | 4/2000 |
| JP | 2000122952 | A | 4/2000 |
| JP | 2000-163283 | | 6/2000 |
| JP | 2000-194583 | | 7/2000 |
| JP | 2000194583 | A | 7/2000 |
| JP | 2000-278773 | | 10/2000 |
| JP | 2000-309145 | | 11/2000 |
| JP | 2001-154953 | | 6/2001 |
| JP | 2001154953 | A | 6/2001 |
| JP | 2001-337817 | | 12/2001 |
| JP | 2001-344129 | | 12/2001 |
| JP | 2001344129 | A | 12/2001 |
| JP | 2003-140991 | | 5/2003 |
| JP | 2003140991 | | 5/2003 |
| JP | 2003-223603 | | 8/2003 |
| JP | 2006-277752 | | 10/2006 |
| JP | 2006277752 | A | 10/2006 |
| JP | 4808911 | | 11/2011 |
| JP | 2013-058231 | | 3/2013 |
| JP | 05492968 | | 5/2014 |
| WO | WO97/30879 | | 1/1997 |
| WO | WO98/20439 | | 5/1998 |
| WO | WO98/33302 | | 7/1998 |
| WO | WO98/38910 | | 9/1998 |
| WO | WO98/41943 | | 9/1998 |
| WO | WO99/21336 | | 4/1999 |
| WO | WO99/57649 | | 11/1999 |
| WO | WO99/57837 | | 11/1999 |
| WO | WO99/57838 | | 11/1999 |
| WO | WO99/64958 | | 12/1999 |
| WO | WO00/07099 | | 2/2000 |
| WO | WO0007099 | A1 | 2/2000 |
| WO | WO00/23894 | | 4/2000 |
| WO | WO02/10919 | | 2/2002 |
| WO | WO02/21239 | | 3/2002 |
| WO | WO02/21299 | | 3/2002 |
| WO | WO02/21414 | | 3/2002 |
| WO | WO02/21415 | | 3/2002 |
| WO | WO02/21777 | | 3/2002 |
| WO | WO02/25501 | | 3/2002 |
| WO | WO03/021464 | | 3/2003 |
| WO | WO03/054439 | | 7/2003 |
| WO | WO2004/059447 | | 7/2004 |
| WO | WO2006/009402 | | 1/2006 |
| WO | WO2008/083177 | | 7/2008 |

OTHER PUBLICATIONS

24×7, HealthTech Publishing Company, Inc. (Nov. 1996).
"Remote Diagnostics: Strategic weapon in the war for multi-vendor service contracts," Tech Assessment, vol. 3, No. 12, Dec. 1995.
"Siemens Medical, BJC Health System Extend deal to multivendor service," Medical Imaging News, vol. 6, No. 26, Jun. 27, 1997.
Dec. 27, 1995, SCAN Diagnostic Imaging, vol. 8, No. 24.
Apr. 22, 2005 Literature Search by Keyword: CyberTAC.
Adelberg, D., "Building Robust Wrappers for Text Sources", [online] Retrieved from the Internet:<URL:http://student.bu.ac.bd/~mumit/Research/NLP-bib/papers/Adelberg99.pdf> [retrieved on Nov. 24, 2008] (1999).
Allegro Software product release 1-61 overview Greenhills Software Inc., [online] Jun. 10, 2002, pp. I-I, XPOO2201939 Retrieved from the Internet: <URL: http://www.ghs.com/partners/allegro/> [retrieved on Jun. 10, 2002] the whole document.
Allegro, RomWebCLient Embedded HTTP client Toolkit: ALLEGROSOFT, Circuit Cellar Online, Sep. 7, 2000, pp. 1-2, XP-002201983, URL:http://web.archive.orgweb/20000709204234/http://www.allegrosoft.com/romwebclient.html.
Bock, G., "Mainstreaming XML-based Enterprise Applications: Using Oracle XML DB to Manage Financial Information within a Global Banking System", Oracle Corporation, (C) 2003.
Box, et al., Simple Object Acces Protocol (SOAP) 1.1, Document No. XP002250270, May 8, 2000.
Chandler, T. et al., "The Technology Development of Automatic Metering and Monitoring Systems", Int'l Power Engineering Conf. 2005, IEEE, 4 pgs.
Cheung, D. et al., "Distributed and Scalable XML Document Processing Architecture for E-Commerce Systems", Adv. Issues of E-Commerce and Web-Based Information Systems, WECWIS 2000, 2nd Int'l Workshop, (Jun. 2000), pp. 152-157.
Ennis, D., "CORBA and XML Integration in Enterprise Systems", IONA Technologies Inc.[online], Retrieved from the Internet:<URL:http://citeseer.ist.psu.edu/cache/papers/cs/16013/http:zSzzSzwww.iona.comzSzinfozSztechcenterzSzecoop2000apr17.pdf/ennis00corba.pdf> [retrieved on Nov. 24, 2008] (2000).
Ennis, Darach, "Cobra and XML Integration in Enterprise Systems", Trinity College Dublin, IONA Technologies Inc.
Citrix Online, Citrix Systems, Inc. Whilte Paper, "GoToMyPC Security", [online] Retrieved from the Internet: URL:http://www.citrix.it/REPOSITORY/docRepository/id_979_1124821417888736.pdf [retrieved on Mar. 16, 2010] (2004).
Citrix Online, Citrix Systems, Inc. Whilte Paper, "GoToMyPC Corporate Technology", [online] Retrieved from the Internet:URL:http://www.gotomypc.com/downloads/pdf/m/GoToMyPC_Corporate_Technology_White_Paper.pdf [retrieved on Mar. 16, 2010] (2004).
CyberTAC & RadScape Presentation (May 1997).
CyberTAC Design Presentation (1997).
CyberTAC from Virtual Impact Systems, Inc. Presentation (1997).
CyberTAC Remote Support System Presentation (1997).
Database WIP, Section El, Week 200156, Abstract, Document No. XP002253876 (Korea Electronics & Telecom Res Inst.) Derwent Publications, Ltd., London, GB, (Mar. 5, 2001).
Eastvold, Roger, "Services: the Next Generation," The Professional Journal, vol. 20, No. 4.
Eastvold, Roger, "Tiss and Tell," Medical Imaging, Sep. 1995.
EBITS:Electronic Business & Information Technology for Society Research Consortium Internet: <URL: www.cs.dartmouth.edu/~makedon/cs188/proposal.html>.
EBITS:Electronic Business & Information Technology for Society Research Consortium, Proposal for Development of an Educational and Research Infrastructure for Safe Electronic Commerce, [online]

(56) References Cited

OTHER PUBLICATIONS

Retrieved from the Internet:<URL:http://www.cs.dartmouth.edu/~makedon/cs188/proposal.html>, [retrieved Feb. 15, 2005].
Jiang, et al., "Record-Boundary Discovery in Web Documents", [online] Retrieved from the Internet:<URL:http://osm7.cs.byu.edu/deg/papers/SJ.Thesis.ps>, [retrieved on Nov. 24, 2008] (1999).
Emmerich et al., Implementing Incremental Code Migration with XML, IEEE, 4-11, (Jun. 2000).
EmWare Press Release: "emWare Announces Support for Sun Microsystems Jini Technology," Salt Lake City, UT (Feb. 17, 1999).
EmWare Press Release: "emWare Delivers EMIT 3.0 SDK Pro-A Complete Device Networking Kit for Developing End-to-end, Embedded Device Networking Solutions," Salt Lake City, UT (May 24, 1999).
EmWare Press Release: "emWare, IBM Demonstrate Next Phase in Establishing Worldwide Access to Embedded Devices," Chicago, IL (Mar. 2, 1999).
EmWare Press Release: "emWare's emLink (TM) Used to Internet-enable Welch Allyn's Vital Signs Monitor," Chicago, IL (Mar. 2, 1999).
EmWare Press Release: "Invensys Selects emWare EMIT Device-Networking Software to Add Remote Monitoring and Control Capabilities to its Controller Products," Salt Lake City, UT (Jun. 14, 1999).
EmWare Press Release: "Motorola, Mitsubishi and National Semiconductor Join emWare's Embed the Internet Alliance," Chicago, IL (Mar. 2, 1999).
ExpertCity, Inc., Whilte Paper, "GoToMyPC: Making Life Simpler for Teleworkers and Travelers", [online] Retrieved from the Internet:URL:http://www.si.umich.edu/Classes/540/Placement/GoOvrvew.pdf [retrieved on Mar. 16, 2010] (2001).
Franklin, M. et al., "Data in Your Face: PUSH Technology in Perspective", Proc. ACM SIGMOD Int'l Conf. on Mgmt of Data, (Jun. 1998), #XP000886180, pp. 516-519.
Hanckmann, J., "Telescript: The Emerging Standard for Intelligent Messaging," Philips Telecommunications Review, vol. 52(1), pp. 15-19 (Mar. 1994).
Universal Plug & Play Device Architecture, (C) Microsoft Corporation (Jun. 8, 2000), [online] Retrieved from the Internet: <URL:http://www.upnp.org/specs/arch/upnpda10_20000613.htm>, [retrieved on Nov. 24, 2008].
http://www.upnp.org/download/UPnPDA10_20000613.htm (pp. 1-52).
Incremona, A. "Remote Service Diagnostics for Imaging Equipment: Today and Tomorrow," Advanced Imaging, 12(9):90(2) (1997).
Jennyc, Kenn S., "Linking Enterprise Business Systems to the Factory Floor," The Hewlett-Packard Journal, Article 9 (May 1998).
Kafeza, E. et al., "Alerts in Mobile Healthcare Applications: Requirements and Pilot Study", IEEE, vol. 8, No. 2, pp. 173-181 (Jun. 2004).
Kimball, R., "XML Will Make it Easier," Intelligent Enterprise, [online] Retrieved from the Internet:<URL:http://www.intelligententerprise.com/010416/webhouse1_1.jhtml> [retrieved on Nov. 24, 2008] (Apr. 16, 2001).
Koppen, E., et al., "Active Hypertext for Distributed Web Applications", Enabling Technologies: Infrastructure for Collaborative Enterprises, (WET ICE '99), Proc. IEEE 8th Int'l Workshop (1999), pp. 297-302.
Kovar, J., "Xerox Unveils Expanded Channel Lineup; Also Plans to Introduce E-Mail, Queue Management Software," PC Expo,(Jun. 18, 1999).
Lassman, M. et al., "Modern Nuclear Medical Diagnostics with Efficient Gamma Cameras," Electromedica, 66(2):43-51, (1998).
Lewandowska, J., et al., "System for Grouping Technologically Similar Devices", v. 48 n. 12; (Dec. 1975), pp. 636-638 (English Abstract).
Layman, et al., "XML-Data," Position Paper from Microsoft Corp. (Jun. 20, 1997), [online] Retrieved from the Internet:<URL:http://www.oasis-open.org/cover/xml-data9706223.html> [retrieved on Sep. 2, 2004].
Lerner, R., "At the Forge: Introducing SOAP", Linux Journal, pp. 62-70, (Mar. 2001).
Lindley, D., "Xerox unveils copier that phones for help," Rochester Democrat and Chronicle, (Mar. 28, 1990).
Luh, James C., "With several specs complete, XML enters widespread development," Internet World, (Jan. 4, 1999).
Martin, D., "Professional XML"., WROX Press Ltd., pub., Ch. 11, 'Server to Server', pp. 559-562, 819-820 (2000).
Mason, K., "XML Translation for block structured languages", IBM Corporation: Research Disclosure, Kenneth Mason Publications, 44176 (2001).
Math Markup Language (Chapter 4); [online] Retrieved from the Internet:<URL:http://www.w3.org/TR/REC-MathML/chap4_4.html>, [retrieved on Feb. 15, 2005].
McBride, R.A., "Security Considerations for Active Messages," ACM SIGICE Bulletin, vol. 22 (2), (Oct. 1996).
Memphis Educational Computer Connectivity Alliance (MECCA), [online] Retrieved from the Internet:<URL:http://www.mecca.org/~Itague/nsfnocostextension.html>, [retrieved on Feb. 15, 2005].
Mills et al., "A knowledge-based method for inferring semantic concepts from visual models of system behavior," ACM (Jul. 2000), pp. 306-337.
Orasis Medical Services, Inc., Business Plan Copy No. 001, (Nov. 1995).
Pfeiffer, R., "XML Tutorials for Programmers: Tutorial 2: Writing XML Documents," (1996) [online] Retrieved from the Internet:<URL:http://imb.com/xml>, [retrieved on Mar. 2, 1999].
Questra Applications Data Sheet (2002).
Questra Preliminary Invalidity Contentions, dated Apr. 29, 2005.
Reagan, K., "Technology for the Soul," OC Metro, (Sep. 1, 1995).
"RomWebClient Embedded HTTP client 1-61 Toolkit", ALLEGROSOFT, pp. 1-2, Jul. 9, 2000 Retrieved from the Internet: <URL: http://www.allegrosoft.com/romwebclient.html>, [retrieved on Dec. 6, 2006].
Rytting, T., "Dispensing the Goods, Embedded Style," Circuit Cellar Online, (Oct. 1999).
Schmidt, A Evolution of Workflow Standards, IEEE (1999).
SOAP Archives Online, "Multiple Method Calls in SOAP Packet"; [online] Retrieved from the Internet:<URL:http://discuss.develop.com/archives/wa.exe?A2=ind9912&L=soap&T=O&F=&S=&P=25113>, [retrieved on Dec. 8, 2000].
Steinfeld, E., "From Standalone to Internet Appliance", Circuit Cellar Online, [online] (Apr. 2000), #XP002201938, Retrieved from the Internet: <URL:http://web.archive.org/web/20000709204234/http://www.alegrosoft.com/romwebclient.html>retrieved on Jun. 12, 2002 the whole document.
Steinfeld, E., "Making the Change" Document No. XP002201937, Circuit Cellar Online, pp. 1-7, Apr. 2000.
Steinfeld, E., "Internet-appliance technology automates test equipment" EDN Magazine, pp. 157-169, Oct. 2000, www.edbmag.com.
Suresh et al., "XML-based Data System for Earth Science Applications", IEEE 2000 International, vol. 3, pp. 24-28, Jul. 2000.
Searls, "The Next Bang: The Explosive Combination of Embedded Linux, XML, and Instant Mess.", ACM (Sep. 2000) Issue 77, pp. 1-15, [online] Retrieved from the Internet:<URL:http://www.linuxjournal.com/article.php?sid=4195>, [retrieved on Nov. 20, 2001].
The Simple Times, vol. 7, No. 1, Mar. 1999; [online] Retrieved from the Internet:<URL:http://www.simple-times.org/pub/simple-times/issues/7-1.html> [retrieved on Aug. 3, 2005].
Trewitt, G., "Using Tcl to Process HTML Forms," Digital Network Systems Laboratory, NSL Technical Note TN-14, Palo Alto, CA (Mar. 1994).
Trewitt, G., "Digital Network Systems Laboratory, NSL Technical Note TN-14, Using Tcl to process HTML Forms".
Virtual Reality Transfer Protocol (VRTP); Retrieved from the Internet:<URL:http://www.stl.nps.navy.mil/~brutzman/vrtp> (1998).
Walsh, Norman, "XSL the Extensible Style Language: Styling XML Documents," New Architect Daily, Jan. 1999.
Webmethods B2B Whitepaper; [online] Retrieved from the Internet:<URL:http://www.cs.wisc.edu/~vganti/papers/b2b_wpB2Bintegration.html> (1999).
White Paper, Medical Imaging, East Providence, RI (Sep. 1995).

(56) References Cited

OTHER PUBLICATIONS

Wigget, Jeremy, "Intraview: Roger Eastvold of Orasis Inc.," 24×7, Nov. 1996.
Wikipedia, "GoToMyPC", [online] retrieved from the Internet:<URL: http://en.wikipedia.org/wiki/Gotomypc> [retrieved on Jan. 21, 2010] (2010).
Williams, T., "Java Goes to Work Controlling Networked Embedded Systems" Computer Design, Pennwell Publ. Littleton, MA, 35:9:36-37, Aug. 1996.
Winer, Dave, "XML-RPC Specification," (http://XML-RPC.com), Jun. 15, 1999.
Winter 1992, Field of View, vol. 2, No. 3, Toshiba America Medical System, Inc.
Wu et al., "A knowledge sharing and collaboration system model based on Internet", Systems, Man, and Cybernetics, 1999. IEEE SMC'99 Conference Proceedings, vol. 2, pp. 148-152 (1999).
Xerox 190 Copier, Electronic Data Interface Operator Guide, ver. 1.0, (1989).
Van der Werff, M., et al., "A Mobile-Based Home Automatic System", IEEE Mobility Conference (2005).
Defense Information Systems Agency, Field Services Office, White Paper Report "pcAnywhere 10.5" (Sep. 2003).
Examination Report in EP Application No. 01955993.9, dated Jan. 29, 2004.
Examination Report in EP Application No. 01955993.9, dated Aug. 5, 2004.
Examination Report in EP Application No. 01955993.9, dated Dec. 16, 2004.
Examination Report in EP Application No. 01973431.8, dated Mar. 8, 2005.
Communication in EP Application No. 01973431.8, dated Mar. 30, 2005.
Examination Report in EP Application No. 01973431.8, dated Jan. 15, 2008.
Office Action in EP Application No. 01996048.3, dated Jun. 22, 2004.
Office Action in EP Application No. 01996048.3, dated Mar. 11, 2005.
Office Action in EP Application No. 01955993.9, dated Jun. 6, 2005.
Office Action in EP Application No. 01973431.8, dated Mar. 8, 2005.
Office Action in EP Application No. 01955993.9, dated Aug. 5, 2004.
Office Action in counterpart EP Application No. 01955993.9, dated Jan. 29, 2004.
Examination Report in EP Application No. 03719774.6, dated Sep. 12, 2005.
Examination Report in EP Application No. 03719774.6, dated Apr. 12, 2006.
Examination Report in EP Application No. 01973431.8, dated Feb. 6, 2009.
Search Report from EP Application No. 01955993.9, dated Dec. 16, 2004.
Search Report in EP Application No. 02792391.1, dated Nov. 19, 2009.
Examination Report in EP Application No. 01973431.8, dated Mar. 23, 2010.
Examination Report in EP Application No. 02792391.1, dated Mar. 10, 2010.
Response to Examination Report in EP Application No. 01973431.8, dated Oct. 4, 2010.
Letter from Foreign Associate regarding response filed in EP Application No. 01973431.8, dated Oct. 8, 2010.
English translation of Notification of Reasons for Refusal in Japanese Application No. 2002-529431, dated Nov. 8, 2010.
English translation of Action in Japanese Application No. JP 2002-515578, dated Jul. 26, 2011.
Notice of Reasons for Rejection in Japanese Application No. 2002-529431, dated Nov. 8, 2010.
Examination Report in EP Application No. 02792391.1, dated Feb. 27, 2012.
Machine Translation of Japanese Patent Publication No. 09-305407 (Pub Date Nov. 1997).
Machine Translation of Japanese Patent Publication No. 11-296453, (Pub Date Oct. 1999).
Machine Translation of Japanese Patent Publication No. 11-203079, (Pub Date Jul. 1999).
Machine Translation of Japanese Patent Publication No. 2000-309145, (Pub Date Nov. 2000).
Machine Translation of Japanese Patent Publication No. 2001-337817, (Pub Date Dec. 2001).
Machine Translation of Japanese Patent Publication No. 11-045195, (Pub Date Feb. 1999).
Machine Translation of Japanese Patent Publication No. 2000-163283, (Pub Date Jun. 2000).
Final Decision for Rejection in Japanese Patent Application No. 2002-515578, dated Jul. 10, 2012.
International Search Report in Application No. PCT/US2002/040058, dated Nov. 3, 2003.
International Preliminary Examination Report in Application No. PCT/US2002/040058, dated Jun. 10, 2004.
International Search Report in Application No. PCT/US01/23651, dated Jun. 3, 2002.
International Search Report in Application No. PCT/US01/29787, dated Jun. 28, 2002.
International Preliminary Examination Report in Application No. PCT/US01/29787, dated Aug. 21, 2002.
International Preliminary Examination Report in Application No. PCT/US01/23651, dated Oct. 10, 2002.
International Search Report in Application No. PCT/US01/45198, dated Apr. 29, 2003.
International Search Report in Application No. PCT/US03/11707, dated Sep. 24, 2003.
International Search Report and Written Opinion in Application No. PCT/US03/11701, dated Oct. 13, 2004.
Written Opinion in Application No. PCT/US01/45198, dated May 31, 2007.
International Preliminary Examination Report in Application No. PCT/US01/45198, dated Apr. 2, 2008.
International Preliminary Report on Patentability (incl. Written Opinion) in Application No. PCT/US2007/088858, dated Jul. 9, 2009.
International Search Report &. Written Opinion in Application No. PCT/US2007/088858, dated May 21, 2008.
Summons to attend Oral Proceedings in counterpart EP Application No. 01973431.8, dated Feb. 2, 2011.
Second Auxiliary Response in EP Application No. 01973431.8, dated Apr. 26, 2011.
Oral Proceedings Communication in Application No. EP01973431. 8, dated May 12, 2011.
Oral Proceedings in EP Application No. 01955993.9, 7 pgs, dated Jan. 16, 2006.
Decision to Refuse in Application No. EP01973431.8, dated Jun. 21, 2011.
Action in Application No. JP 2002-515578, dated Jul. 26, 2011.
Response filed in Application No. JP2002-529431, dated May 2, 2011.
Summons to attend oral proceedings in corresponding European Application No. 01955993.9 dated Oct. 31, 2005.
Result of Consultation of Nov. 24, 2005 and Nov. 25, 2005 from corresponding European Application No. 01955993.
Submission in German dated Nov. 25, 2005 from corresponding European Application No. 01955993.9.
Annex to EPO Form 2004 with claims for grant in European Application No. 01955993.9 (Nov. 29, 2005).
Oral Proceeding Minutes in European Application No. 01955993.9, dated Jan. 16, 2006.
Communication dated Apr. 26, 2005 in European Application No. 01955993.9.
Action and Response History in U.S. Appl. No. 11/537,399.
Action and Response History in U.S. Appl. No. 11/774,474.
Action and Response History in U.S. Appl. No. 13/329,928.
Action and Response History in U.S. Appl. No. 09/627,201.
Action and Response History in U.S. Appl. No. 10/805,012.

(56) References Cited

OTHER PUBLICATIONS

Action and Response History in U.S. Appl. No. 09/667,737.
Action and Response History in U.S. Appl. No. 11/677,279.
Action and Response History in U.S. Appl. No. 09/716,717.
Action and Response History in U.S. Appl. No. 09/708,384.
Action and Response History in U.S. Appl. No. 11/616,136 through Nov. 16, 2010.
Action and Response History in U.S. Appl. No. 10/784,138, on Sep. 23, 2010.
Action and Response History in U.S. Appl. No. 11/538,402, on May 17, 2011.
Action and Response History in U.S. Appl. No. 11/503,638.
Action and Response History in U.S. Appl. No. 10/123,960.
Action and Response History in U.S. Appl. No. 11/673,943.
Action and Response History in U.S. Appl. No. 10/124,181.
Action and Response History in U.S. Appl. No. 10/028,126.
Wikipedia, Java (software platform), http://en.wikipedia.org/wiki/Java_(software_platform), Jul. 11, 2013 (12 pages).
Japanese Office Action, for JP Appl No. 2012-245293, dated Sep. 24, 2013.
Claims Pending in Corresponding Japanese Office Action as of at least Jul. 11, 2013.
Japanese Office action in English from Japanese application 2012-245293 mailed Oct. 1, 2013 (4 pages).
Japanese Office Action with English translation from JP Application No. 2012-245293 mailed Oct. 1, 2013.

\* cited by examiner

REPORTING THE STATE OF AN APPARATUS TO A REMOTE COMPUTER

CLAIM TO PRIORITY

This patent application is a continuation of U.S. patent application Ser. No. 11/503,638, filed on Aug. 14, 2006 now U.S. Pat. No. 8,055,758. U.S. patent application Ser. No. 11/503,638 is a continuation of U.S. patent application Ser. No. 09/708,384, filed on Nov. 8, 2000 now U.S. Pat. No. 7,117,239. U.S. patent application Ser. No. 09/708,384 is a continuation-in-part application of U.S. patent application Ser. No. 09/627,201, filed on Jul. 28, 2000 now U.S. Pat. No. 6,757,714. The disclosures of U.S. patent application Ser. Nos. 11/503,638, 09/708,384 and 09/627,201 are considered part of (and are incorporated by reference into) the disclosure of this application as if set forth herein in full. Priority is hereby claimed to each of U.S. patent application Ser. Nos. 11/503,638, 09/708,384 and 09/627,201.

BACKGROUND

This invention relates to using a device embedded in an apparatus (an "embedded device") to report the state of the apparatus to a remote computer.

An apparatus may contain an embedded device, such as a controller, to monitor and control its operation. Any type of apparatus may have an embedded device, including, but not limited to, home appliances, such as washing machines, dishwashers, and televisions, and manufacturing equipment, such as robotics, conveyors and motors.

Embedded devices are often connected to an internal network, such as a local area network (LAN), with an interface to the Internet. Other devices on the internal network may communicate with the embedded devices over the internal network.

SUMMARY

In general, in one aspect, the invention is directed to using a device embedded in an apparatus to report the state of the apparatus to a remote computer. This aspect of the invention features detecting the state of the apparatus, generating a message that reports the state of the apparatus using a self-describing computer language, and sending the message to the remote computer. An example of a self-describing computer language is eXtensible Markup Language (XML). Examples of messages that may be sent include an electronic mail (e-mail) message and a hypertext transfer protocol (HTTP) command, both containing XML code.

By virtue of the device-generated message, the remote computer can obtain the state of the apparatus even if the remote computer cannot directly address the embedded device. Thus, computers that cannot communicate directly with the embedded device, such as computers that are not on the same internal network as the embedded device, can still obtain the status of the apparatus. Moreover, because the state is reported using a self-describing computer language, the remote computer can interpret the state without the aid of a person. As a result, processes, such as maintenance and the like, can be scheduled automatically for the apparatus and/or embedded device by the remote computer.

This aspect of the invention may include one or more of the following features. The state is indicative of an error condition in the apparatus. The error condition is a variable that deviates from an acceptable value or a predetermined range of acceptable values. The function of detecting the state includes receiving the state from the apparatus by, e.g., retrieving the state periodically from the apparatus. The function of detecting the state includes obtaining an identifier for the apparatus, the identifier relating to the state of the apparatus, and using the embedded device to read the state from the apparatus using the identifier.

This aspect of the invention may also include determining if the state of the apparatus has changed. The message is generated if the state of the apparatus has changed and is not generated otherwise. The function of determining if the state of the apparatus has changed includes comparing the state received from the apparatus to a previous state of the apparatus.

The message is generated using a predefined template by obtaining one or more variables relating to the apparatus and inserting the one or more variables into the template. The state of the apparatus may be included as part of a body of an e-mail message or as part of an attachment to the e-mail message. The state of the apparatus may be included as part of an HTTP command.

In general, in another aspect, the invention is directed to obtaining a state of an apparatus from a device, such as a controller, embedded in the apparatus. This aspect of the invention features receiving a message that reports the state of the apparatus using a self-describing computer language and extracting the state of the apparatus from the message.

This aspect of the invention may include one or more of the following features. The self-describing computer language is XML. The state of the apparatus is indicative of an error condition in the apparatus. The error condition is a variable that deviates from an acceptable value or a predetermined range of acceptable values. The state of the apparatus is passed to a customer relationship management system. The message may be included in an HTTP command or may be part of an e-mail.

In general, in another aspect, the invention features a system that includes first and second devices. The first device includes circuitry that generates a message reporting a state of an apparatus using a self-describing computer language. The second device is in communication with the first device. The second device includes circuitry that receives the electronic mail message from the first device.

This aspect of the invention may include one or more of the following features. The second device receives the message from the first device and extracts the state of the apparatus from the message. The first device is embedded in the apparatus and the second device is a remote computer. The message may be included in an HTTP command or may be part of an e-mail.

Other features and advantages of the invention will become apparent from the following description, including the claims and drawings.

DESCRIPTION

Figure 1:
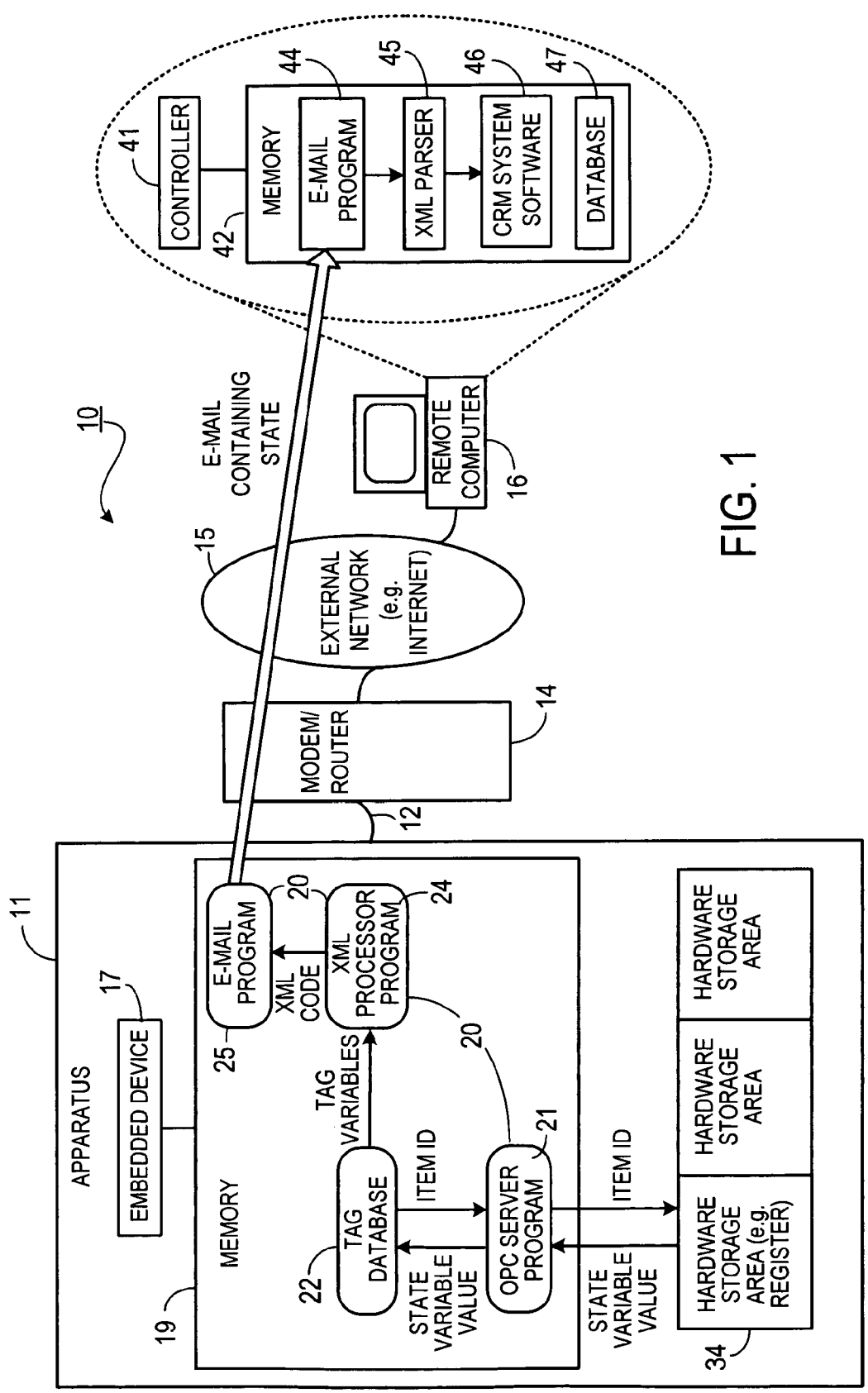
FIG. 1 is a block diagram of a network containing a remote computer and an apparatus having an embedded device.

FIG. 1 shows a network 10. Network 10 includes an apparatus 11 containing an embedded device 17, such as a controller (e.g., a microprocessor). Apparatus 11 is connected to an internal network 12, such as a LAN. A router or modem 14 interfaces internal network 12 to an external network 15, such as the Internet, that runs TCP/IP (Transmission Control Protocol/Internet Protocol) or some other suitable protocol. Connections may be, e.g., via Ethernet, wireless link, or telephone line. External network 15 contains remote computer 16, which may be a server, a personal computer (PC), or any other type of processing device. Other devices (not shown) may be included on internal network 12 and external network 15.

Processing in the Embedded Device

Apparatus 11 may be any type of device or may be included in any system having functions that are monitored and controlled by embedded device 17. Among other things, embedded device 17 executes software stored in memory 19 to generate and send, to remote computer 16, an e-mail message reporting the state of apparatus 11.

Software 20 includes an OPC (OLE for Process Control) server program 21, an XML (eXtensible Markup Language) processor program 24, and an e-mail program 25. E-mail program 25 is an SMTP-compliant (Simple Mail Transfer Protocol) program for sending e-mail from embedded device 17 to Internet addresses and for receiving e-mail from the Internet. E-mail program 25 operates as a mail transfer agent (MTA) for e-mail messages arriving at embedded device 17 and a mail delivery agent (MDA) for e-mail messages originating from embedded device 17. Other mail transfer protocols and programs may be also used by embedded device 17 in addition to, or instead of, those noted above.

XML processor program 24 is a program for generating XML code that reports the state of apparatus 11. XML is a self-describing computer language that defines variables and values relating to those variables. XML is self-describing in the sense that fields in the XML code identify variables and their values in the XML code. The template for XML used to generate an e-mail is as follows:

<name>temperature</name><value><##temperature##></value>, where the "name" field identifies the name of a variable and the "value" field identifies the value of the variable that follows the "name" field. So, for the example given above, the variable is "temperature" and a value (e.g., 33.8) may be inserted for that variable as follows:

<name>temperature</name><value>33.8</value>.

XML processor program 24 generates XML code having the above syntax from a tag database 22 stored in memory 19.

Figure 2:
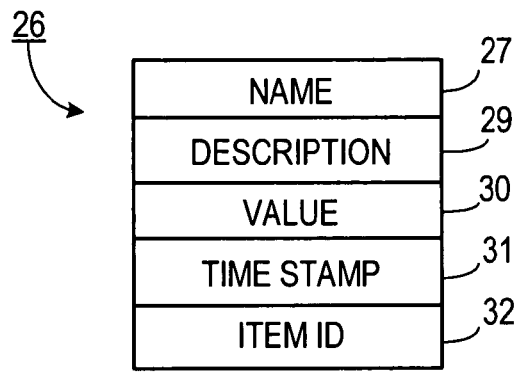
FIG. 2 shows the format of a tag used to store state variables for the apparatus.

Tag database 22 contains tags for use by XML processor program 24 in generating XML code. FIG. 2 shows an example of a format for a tag 26, although other formats may be used. Tag 26 contains a name field 27, a description field 29, a value field 30, a time stamp field 31, and an item identifier (ID) field 32. These fields are used to obtain, identify and store information relating to apparatus 11.

Name field 27 holds the name of a state variable for apparatus 11, such as "temperature", and description field 29 provides further identification information, such as "temperature of fluid in a tank". Value field 30 holds the value of the state variable and time stamp field 31 holds the time that the value in value field 30 was obtained. Value field 30 may include a variant, which is a construct that holds the value as an integer, a real number, a boolean, a character string, or some other type. Item ID field 32 holds an identifier that corresponds to hardware that is being monitored within apparatus 11. The identifier corresponds to a register location or to some other storage area of apparatus 11 that contains the value for field 30. For example, if embedded device 17 is in a robotics system, item ID field 32 might correspond to a register in the robotics system that contains a velocity or position of a robotic arm.

OPC server program 21 reads item IDs from field 32 and uses those item IDs to read variable values from corresponding hardware storage areas 34. OPC server program 21 implements an industrial automation protocol, such as MODBUS TCP, to communicate with the apparatus hardware. The system is not limited to use with the MODBUS protocol or with OPC server program 21; any drivers or computer programs may be used to read the state variable values from the hardware. Once a state variable value has been read, OPC server program 21 inserts the variable value into field 30 of the appropriate tag.

Figure 3:
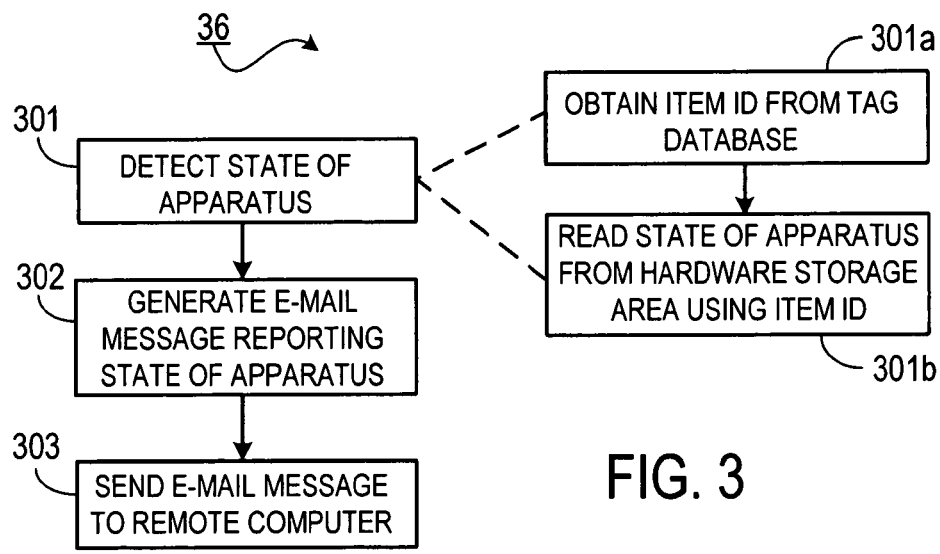
FIG. 3 is flowchart of a process performed by the embedded device to report the state of the apparatus to the remote computer.

FIG. 3 shows a process 36 for reporting the state of apparatus 11 to remote computer 16 using e-mail. In this embodiment, process 36 is implemented by OPC server program 21, XML processor program 24, e-mail program 25, and system software (not shown) executing in embedded device 17. The system software may include an operating system or other programs that control the background operation of embedded device 17.

Process 36 detects (301) the state of apparatus 11. The state may be indicative of an error condition (described below) within apparatus 11 or it may simply be state variables of apparatus 11 that are obtained at a particular time. To detect the state of apparatus 11, OPC server program 21 polls the hardware in apparatus 11 periodically. To perform this polling, OPC server program 21 obtains (301a) an item ID from tag database 22 and reads (301b) the value of a state variable that corresponds to the item ID from the appropriate hardware storage location. Process 36 may report the value to the remote computer as is or, alternatively, process 36 may use the value to identify and report an error condition in the hardware. A process for reporting error conditions is described below.

Process 36 generates (302) an e-mail message reporting the value of state variable(s) for apparatus 11. Specifically, XML processor program 24 retrieves both the name of each state variable and the value of the state variable from the appropriate tag(s) in tag database 22. Other variables may also be retrieved from tag database 22 including the time stamp, description, and whatever other variables are stored in tag database 22. Which information is retrieved is pre-set in XML processor program 24. The retrieved variables are used by XML processor program 24 to generate XML code for an e-mail to remote computer 16.

XML processor program 24 may generate the XML code "on the fly", meaning without the use of a template. In this case, a blank XML file is populated with the retrieved variables in XML format by XML processor program 24. Alternatively, XML processor program 24 may generate the XML code using a pre-defined and formatted template. The template may be obtained by XML processor program 24, e.g., from memory 19 or a remote storage location (not shown). For example, the template may contain formatting similar to that shown above, namely:

```
<name>temperature</name><value><##temperature##></value>.
```

To generate the XML code from the template, XML processor program 24 scans through the template and inserts state variable value(s) retrieved from tag database 22, where appropriate. XML processor program 24 may generate the XML code periodically, depending upon how often e-mails are to be sent to the remote computer. Alternatively, tag manager software (not shown) may be included to provide newly-received tag variables to XML processor program 24. In this case, XML processor program 24 generates the XML code when it receives the new tag variables.

The resulting XML code may be part of the body of an e-mail or it may part of an attachment to an e-mail. The e-mail also contains a unique identifier, such as a code (e.g., serial number or identifier), that identifies embedded device 17 to remote computer 16. E-mail program 25 obtains the XML code from XML processor program 24 and sends it to remote computer 16 as part of the e-mail message. E-mail program 25 obtains the code periodically, depending upon the frequency at which e-mails are to be sent to the remote computer. The frequency is set beforehand in embedded device 17. The address of the remote computer may be registered with e-mail program 25 beforehand. Typically, the address/remote computer will be that of an entity that requires information about apparatus 11. For example, the entity may be a manufacturer of the apparatus, a plant monitoring system, or the like. The e-mail program sends the message to router/modem 14, which transfers it via external network 15 to remote computer 16. Then, the e-mail message is processed as described below.

The foregoing describes the case where embedded device 17 simply reports the state of apparatus 11 to remote computer 16 periodically. Alternatively, embedded device 17 may report the state to remote computer 16 only when an error condition or "alarm" is detected.

Figure 4:
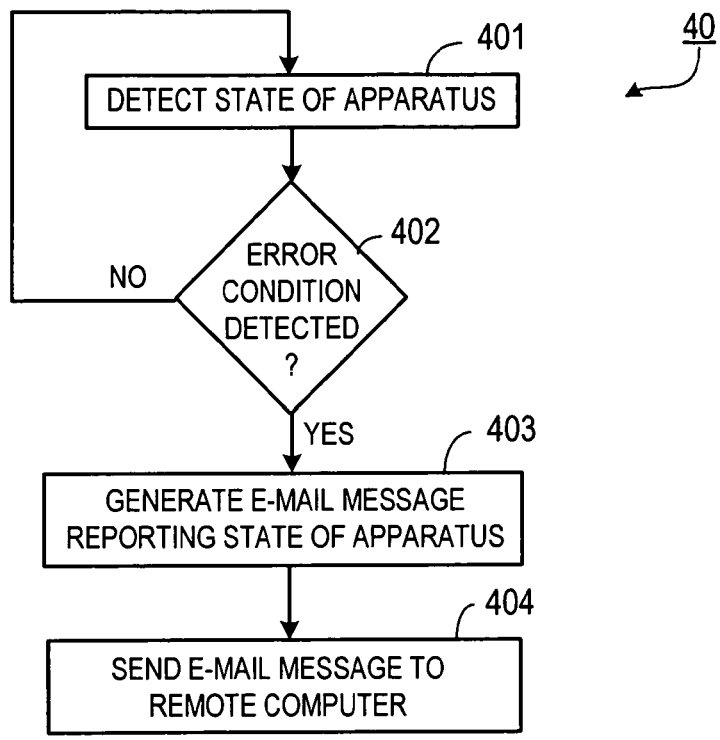
FIG. 4 is a flowchart of an alternative process performed by the embedded device to report the state of the apparatus to the remote computer.

FIG. 4 shows a process 40 by which embedded device 17 detects error conditions in apparatus 11 and sends an e-mail message to remote computer 16 when an error condition is detected. Process 40 detects (401) the state of apparatus 11, where, as above, "state" refers to tag variable values for apparatus 11. Detection (401) is performed in the same manner as process 36; therefore, a description is omitted here. Once process 36 has obtained the state of apparatus 11, process 36 determines (402) if that state represents an error condition.

To detect an error condition, process 40 may compare an obtained state variable value to a predetermined acceptable value or a range of predetermined acceptable values. If the state variable value is outside the range of, or deviates considerably from, the acceptable value(s), then process 40 knows that an error condition is present. Alternatively, process 40 may store each state variable value in memory 19 as it is obtained, and compare each newly-received state variable value to one or more stored state variable values. If the new state variable value deviates by more than a predetermined amount from the stored value(s), process 40 knows that an error condition is present/has occurred.

An error condition may be based on a single state variable value or it may be based on some combination of two or more state variable values. For example, if embedded device 17 is in manufacturing equipment that monitors both a level of fluid in a tank and a temperature of that fluid, an error condition may only be present if both the fluid level and the temperature exceed preset values. In this example, therefore, if only one state variable exceeds its corresponding preset value, then no error condition is present/has occurred.

If process 40 detects (402) an error condition, process 40 generates (403) an e-mail message and sends (404) the e-mail message to remote computer 16. The functions of generating and sending an e-mail message are performed as described above with respect to process 36; therefore, detailed descriptions are omitted here. When generating the e-mail message, e-mail program 25 may place the state variable(s) that caused the error condition in the "subject" line of the e-mail. If process 40 does not detect (402) an error condition, an e-mail message is not sent, whereafter process 40 returns to 401.

XML processor program 24 may maintain a log of error conditions in memory 19. This error condition "history" may be provided along with each new e-mail message. The history may relate to a particular state variable or to more than one state variable. For example, if the error condition pertains to temperature, XML processor program 24 may include the error condition history for temperature in the e-mail. If the error condition pertains to both temperature and tank level, XML processor program 24 may include the error condition history for both temperature and tank level in the e-mail. If a template is used to generate the e-mail message, portion(s) of that template may be reserved for error condition history.

Processes 36 and 40 can be combined to generate an e-mail periodically that reports the state of apparatus 11 to remote computer 16 even if no error conditions have been detected in apparatus 11, and that also flags any error conditions if any have been detected. XML processor program 24 adds an indicator or the like next to state variable values that correspond to error conditions.

Processes 36 and 40 may be executed by embedded device 17 to monitor and report on any type of state variables in any type of apparatus. For example, processes 36 and 40 may detect state variable values relating to conveyor belt speed, current and/or voltage in electronic devices, tank fluid levels, input/output sensors, and the like. Processes 36 and 40 may detect state variable values through a programmable logic controller (PLC) that is connected to one or more other devices. A PLC includes plug-in cards for each device that obtain and store device state variable values. OPC server program 21 communicates with these plug-in cards to obtain the device state variable values for generating e-mails as described above.

E-mails generated by processes 36 and 40 report the state of apparatus 11 using a self-describing computer language, such as XML; however, other types of self-describing computer languages may be used. In addition, other text and/or images may be included in the e-mails, if desired and appropriate under the circumstances. Described below is a process that is performed by remote computer 16 to interpret e-mails received from embedded device 17.

Processing In The Remote Computer

Remote computer 16 contains a controller 41 for executing software stored in memory 42. Among this software is e-mail program 44, XML parser 45, and customer relationship management (CRM) system software 46.

As in embedded device 17, e-mail program 44 is an SMTP-compliant program for receiving e-mail from embedded device 17 and other such devices. E-mail program 44 operates as a mail transfer agent (MTA) for e-mail messages arriving at remote computer 16 and a mail delivery agent (MDA) for e-mail messages originating from remote computer 16. E-mail program 44 uses the same protocol as e-mail program 25 in embedded device 17.

XML parser 45 parses XML code in a received e-mail to extract variable values, including an identifier for apparatus 11. XML parser 45 recognizes field names, such as "name" and "value" from above and extracts corresponding state variable values from those fields. That is, XML parser 45 knows the syntax of XML. Knowing this, XML parser 45 is able to extract variable names from the "name" fields, corresponding variable values from the "value" fields, and any other information in the XML code.

XML parser 45 passes the state variable values, along with appropriate identifiers, to customer relationship management system software 46 or whatever other software or database requires/uses those state variable values.

Figure 5:
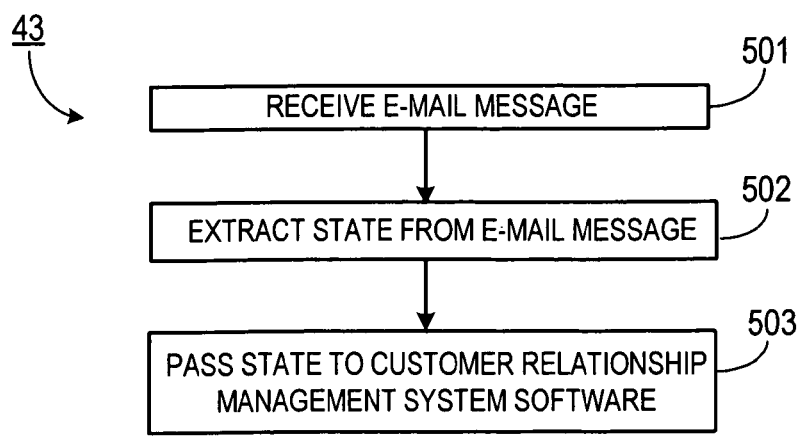
FIG. 5 is a flowchart of a process performed by the remote computer to interpret messages received from the embedded device.

FIG. 5 shows how an e-mail from embedded device 17 is processed (43). Once an e-mail has been received (501) from embedded device 17, XML parser 45 extracts (502) the state variable values of apparatus 11 from the e-mail. For example, XML parser 45 may extract tank levels, temperature values, etc., of apparatus 11 monitored by embedded device 17. The state variable values may be indicative of error conditions in apparatus 11, as defined above, or simply state variables for apparatus 11 obtained at a given point in time.

XML parser 45 passes (503) the state variable values, i.e., the state of apparatus 11, to customer relationship management system software 46. Customer relationship management system software 46 uses these state variable values, e.g., to schedule maintenance for apparatus 11 if necessary, to provide software upgrades to apparatus 11, or for any other purpose. Because the XML code in the e-mail is readable by XML parser 45, reporting and scheduling by customer relationship management system software 46 can be done automatically. It is noted that e-mail program 44 may still forward an e-mail to a customer representative, technician, or the like, particularly if an e-mail contains human-readable text.

The software on remote computer 16 is not limited to that shown in FIG. 1. For example, XML parser 45 may be replaced by a parser that is capable of parsing/reading other types of computer code, depending upon the code that is used in the received e-mail. Likewise, the parsed variables can be passed to software other than customer relationship management system software 46. For example, the variables can be stored in a database 47 for later use.

Alternative Embodiment

Figure 6:
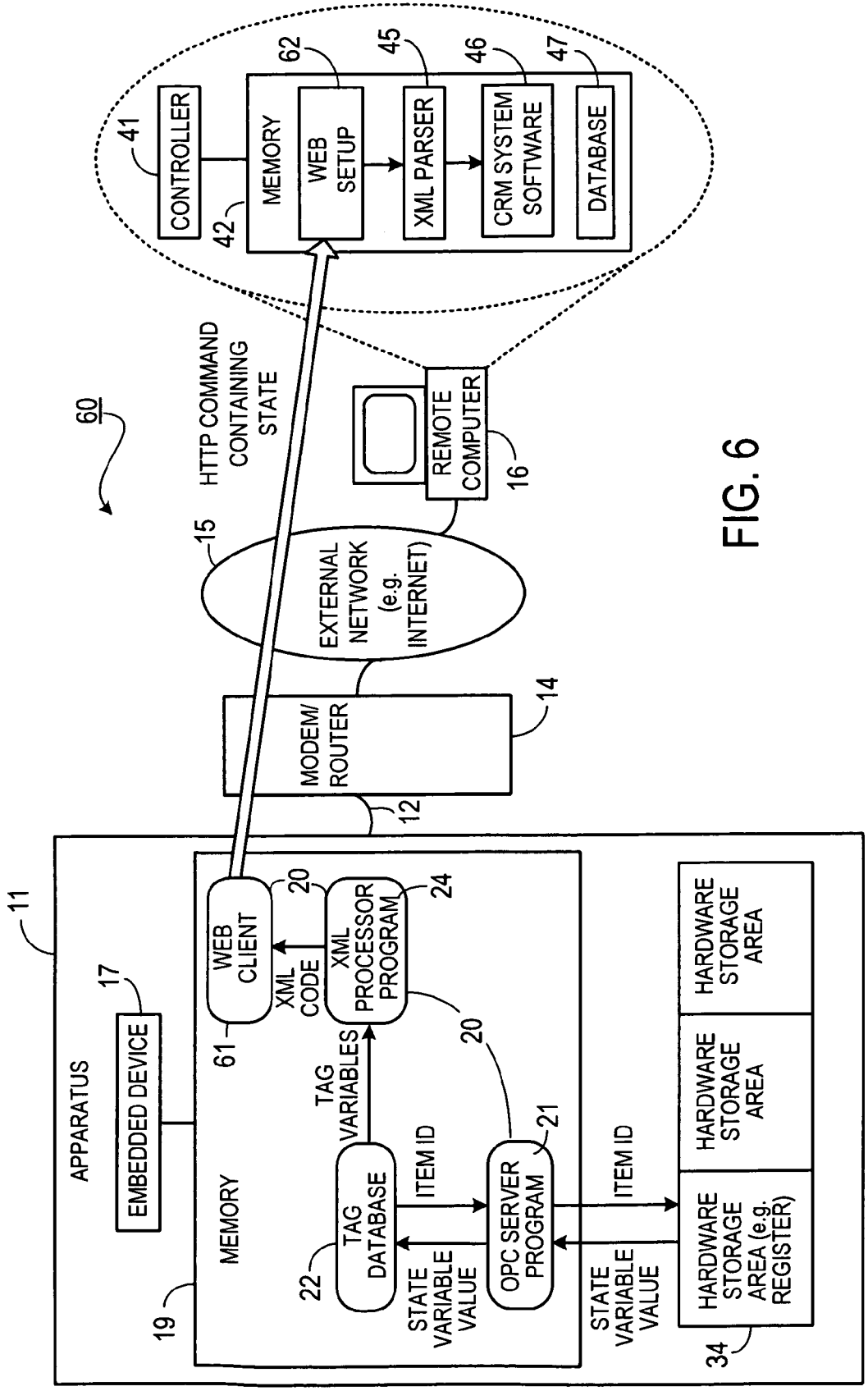
FIG. 6 is a block diagram of a network containing a remote computer and an apparatus having an embedded device the reports on the state of the apparatus using HTTP commands.

Referring to FIG. 6, a network 60 is shown on which an alternative embodiment of the invention is implemented. Network 60 is identical to network 10, except that e-mail program 25 in apparatus 11 is replaced by Web client 61 and e-mail program 44 in remote computer 16 is replaced by Web server 62. This alternative configuration allows embedded device 17 to transfer messages to remote computer 16 as HTTP commands rather than e-mails.

The HTTP command may be an HTTP POST command, although other HTTP commands, such as an HTTP GET command, may instead be used. An example of an HTTP POST command that uses XML code to report the status of a fictitious "widget" apparatus is as follows:

```
POST /CONTROL HTTP/1.1
Host: www.acme.com
Content-Type: text/xml
Content-length: nnn
<?xml version="1.0"?>
<root xmlns="urn:schemas-upnp-org:device-1-0">
   <specVersion>
      <major>1</major>
      <minor>0</minor>
   </specVersion>
   <device>
      <deviceType>urn:www-acme-com:device:Widget:3</deviceType>
      <friendlyName>Widget</friendlyName>
      <manufacturer>Acme Industries</manufacturer>
      <modelName>Widget</modelName>
      <modelNumber>3</modelNumber>
      <serialNumber>53266D</serialNumber>
      <UDN>uuid:4A89EA70-73B4-11d4-80DF-0050DAB7BAC5</UDN>
   </device>
</root>
<parameters>
   <Airflow xsd:type="integer">378</Airflow>
   <Humidity xsd:type="double">46.7</Humidity>
   <Motor xsd:type="integer">1500</Motor>
   <Vent xsd:type="integer">4</Vent>
</parameters>
<alarms>
   <Temperature>
      <description>Room temperature is above 83F</description>
      <severity>300</severity>
      <status>high</status>
   </Temperature>
</alarms>
```

XML is a self-describing computer language in the sense that fields in the XML code identify variables and their values in the XML code. For example, as shown in the above POST command, the "manufacturer" field identifies a manufacturer, e.g., "Acme Industries", and is delineated by "<manufacturer>" to indicate the start of the field and "</manufacturer>" to indicate the end of the field. XML is used in the HTTP command because it can be generated, parsed and read relatively easily by XML parser 45.

The HTTP POST command includes data identifying apparatus 11. This data includes, but is not limited to, data identifying the type of the device, a common (or "friendly") name for the device, the manufacturer of the device, the model name of the device, the model number of the device, the serial number of the device, and a universal unique identifier (UUID) for the device. In the example post command, this data is formatted as:

```
<friendlyName>Widget</friendlyName>
<manufacturer>Acme Industries</manufacturer>
<modelName>Widget</modelName>
<modelNumber>3</modelNumber>
<serialNumber>53266D</serialNumber>
<UDN>uuid:4A89EA70-73B4-11d4-80DF-0050DAB7BAC5</UDN>
```

The HTTP POST command also provides the state of apparatus 11. The state includes operational parameters and alarm conditions for apparatus 11. In the above HTTP POST command, these are formatted as follows:

```
<parameters>
   <Airflow xsd:type="integer">378</Airflow>
   <Humidity xsd:type="double">46.7</Humidity>
   <Motor xsd:type="integer">1500</Motor>
   <Vent xsd:type="integer">4</Vent>
```

```
      </parameters>
      <alarms>
        <Temperature>
          <description>Room temperature is above
83F</description>
          <severity>300</severity>
          <status>high</status>
        </Temperature>
      </alarms>
```

Thus, the state of the widget includes information on its airflow, humidity, motor and vent settings, temperature, severity of the temperature, and temperature status. Different information from that shown may be included in the HTTP POST command.

Referring back to FIGS. 3, 4 and 5, in this embodiment the operation of processes 36, 40 and 43 is identical to that described above, except that, in all steps, the e-mail message is replaced by an HTTP command. In apparatus 11, the HTTP command is generated by Web client 61 based on data provided by XML processor 24. This XML data is the same as that used above with e-mail program 25. Embedded device 17 sends the HTTP command to remote computer 16, where it is received by Web server 62 and then processed by XML parser 45. Thereafter, processing proceeds as above.

Architecture

Processes 36, 40 and 43 are not limited to use with the hardware/software configuration of FIG. 1; they may find applicability in any computing or processing environment. Processes 36, 40 and 43 may be implemented in hardware (e.g., an ASIC {Application-Specific Integrated Circuit} and/or an FPGA {Field Programmable Gate Array}), software, or a combination of hardware and software.

Processes 36, 40 and 43 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 36, 40 and 43.

Processes 36, 40 and 43 may also be implemented as a computer-readable storage medium, configured with a computer program, where, upon execution, instructions in the computer program cause the computer to operate in accordance with processes 36, 40 and 43.

Other embodiments not described herein are also within the scope of the following claims. For example, e-mail or http messages sent from apparatus 11 to remote computer 16 may be queued (e.g., stored in memory 19) and then retrieved and sent out at a later time. Queuing messages reduces message loss resulting from intermittent system failures.

What is claimed is:

1. A method performed by a device associated with an apparatus to report a state of the apparatus to a remote computer, the method comprising:
   detecting the state of the apparatus;
   generating a message that reports the state of the apparatus to the remote computer, the message comprising a HyperText Transfer Protocol (HTTP) command, and the message containing a code that is unique to the device or apparatus, wherein generating is performed periodically or in response to a deviation in the state; and
   sending the message comprising the HTTP command to the remote computer, the HTTP command comprising a command that is configured to report the state of the apparatus using eXtensible Markup Language (XML);
   wherein the device is on an internal network and the remote computer is on an external network that is separate from the internal network, and wherein, as a result, the remote computer cannot initiate communication to an address of the device on the internal network; and
   wherein the state of the apparatus comprises values of two or more variables associated with the apparatus, one or more of the variables being flagged if one or more of the variables corresponds to an error condition associated with the apparatus.

2. The method of claim 1, wherein detecting the state comprises reading variables periodically from storage locations associated with the apparatus.

3. The method of claim 1, further comprising determining the deviation in the state.

4. The method of claim 3, wherein determining comprises comparing the state to a previous state of the apparatus.

5. The method of claim 1, wherein the XML is generated by inserting one or more variables into a predefined template.

6. The method of claim 1, wherein the message includes past states of the apparatus.

7. The method of claim 1, wherein the HTTP command comprises a POST command.

8. The method of claim 1, wherein the message comprises one or more of the following:
   data identifying a type of the device, a common name for the device, a manufacturer of the device, a model name of the device, a model number of the device, a serial number of the device, and a universal unique identifier for the device.

9. The method of claim 1, wherein the state comprises both an error condition and a measurement associated with the apparatus that is not an error condition.

10. The method of claim 2, wherein the storage locations comprise register locations corresponding to hardware associated with the apparatus.

11. The method of claim 1, wherein the message comprises an error condition history, the error condition history indicating error conditions in the apparatus over time.

12. The method of claim 1, further comprising queuing the message in the device prior to sending the message, the message being sent following a failure condition in a system comprising the device and/or the apparatus.

13. One or more non-transitory machine-readable media storing instructions for execution by a device associated with an apparatus to report a state of the apparatus to a remote computer, the instructions for causing the device to perform operations comprising:
   detecting the state of the apparatus;
   generating a message that reports the state of the apparatus to the remote computer, the message comprising a HyperText Transfer Protocol (HTTP) command, the message containing a code that is unique to the device or apparatus, wherein generating is performed periodically or in response to a deviation in the state; and
   sending the message comprising the HTTP command to the remote computer, the HTTP command comprising a command that is configured to report the state of the apparatus using eXtensible Markup Language (XML);

wherein the device is on an internal network and the remote computer is on an external network that is separate from the internal network, and wherein, as a result, the remote computer cannot initiate communication to an address of the device on the internal network; and wherein the state of the apparatus comprises values of two or more variables associated with the apparatus, one or more of the variables being flagged if one or more of the variables corresponds to an error condition associated with the apparatus.

14. The one or more non-transitory machine-readable media of claim 13, wherein detecting the state comprises reading variables periodically from storage locations associated with the apparatus.

15. The one or more non-transitory machine-readable media of claim 13, wherein the operations comprise: determining the deviation in the state.

16. The one or more non-transitory machine-readable media of claim 15, wherein determining comprises comparing the state to a previous state of the apparatus.

17. The one or more non-transitory machine-readable media of claim 13, wherein the XML is generated by inserting one or more variables into a predefined template.

18. The one or more machine-readable media of claim 13, wherein the HTTP command comprises a POST command.

19. The one or more non-transitory machine-readable media of claim 13, wherein the message comprises one or more of the following:
data identifying a type of the device, a common name for the device, a manufacturer of the device, a model name of the device, a model number of the device, a serial number of the device, and a universal unique identifier for the device.

20. The one or more non-transitory machine-readable media of claim 13, wherein the state comprises both an error condition and a measurement associated with the apparatus that is not an error condition.

21. The one or more non-transitory machine-readable media of claim 14, wherein the storage locations comprise register locations corresponding to hardware associated with the apparatus.

22. The one or more machine-readable media of claim 13, wherein the message comprises an error condition history, the error condition history indicating error conditions in the apparatus over time.

23. The one or more machine-readable media of claim 13, further comprising queuing the message in the device prior to sending the message, the message being sent following a failure condition in a system comprising the device and/or the apparatus.

24. A device associated with an apparatus for reporting a state of the apparatus to a remote computer, the device for executing instructions to perform operations comprising:
detecting the state of the apparatus;
generating a message that reports the state of the apparatus to the remote computer, the message comprising a HyperText Transfer Protocol (HTTP) command, and the message containing a code that is unique to the device or apparatus, wherein generating is performed periodically or in response to a deviation in the state; and
sending the message comprising the HTTP command to the remote computer, the HTTP command comprising a command that is configured to report the state of the apparatus using eXtensible Markup Language (XML);
wherein the device is on an internal network and the remote computer is on an external network that is separate from the internal network, and wherein, as a result, the remote computer cannot initiate communication to an address of the device on the internal network; and
wherein the state of the apparatus comprises values of two or more variables associated with the apparatus, one or more of the variables being flagged if one or more of the variables corresponds to an error condition associated with the apparatus.

25. The device of claim 24, wherein detecting the state comprises reading variables periodically from storage locations associated with the apparatus;
wherein the operations comprise determining if the state of the apparatus has changed;
wherein determining if the state of the apparatus has changed comprises comparing the state to a previous state of the apparatus.

26. The device of claim 24, wherein the HTTP command comprises a POST command; and
wherein the message comprises one or more of the following: data identifying a type of the device, a common name for the device, a manufacturer of the device, a model name of the device, a model number of the device, a serial number of the device, and a universal unique identifier for the device.

27. The device of claim 24, wherein the message comprises an error condition history, the error condition history indicating error conditions in the apparatus over time.

28. The device of claim 24, wherein the operations comprise queuing the message in the device prior to sending the message, the message being sent following a failure condition in a system comprising the device and/or the apparatus.

29. A method performed by a device associated with an apparatus to report a state of the apparatus to a remote computer, the method comprising:
detecting the state of the apparatus;
generating a message that reports the state of the apparatus to the remote computer, the message comprising a HyperText Transfer Protocol (HTTP) command, the message using eXtensible Markup Language (XML) to report the state using variables, and the message containing a code that is unique to the device or apparatus,
wherein the message is generated periodically or in response to a deviation in the state by an XML processor that obtains new variables, on which a state is to be reported, from tag management software; and
sending the message to an address of the remote computer registered with the apparatus, the HTTP command comprising a command that is configured to report the state of the apparatus using XML;
wherein the device is on an internal network and the remote computer is on an external network that is separate from the internal network, and wherein the remote computer cannot directly address the apparatus; and
wherein the state of the apparatus comprises values of two or more variables associated with the apparatus, one or more of the variables being identified by an indicator because the one or more of the variables corresponds to an error condition associated with the apparatus.

30. One or more non-transitory machine-readable media storing instructions for execution by a device associated with an apparatus to report a state of the apparatus to a remote computer, the instructions for causing the device to perform operations comprising:

detecting the state of the apparatus;

generating a message that reports the state of the apparatus to the remote computer, the message comprising a HyperText Transfer Protocol (HTTP) command, the message using eXtensible Markup Language (XML) to report the state using variables, and the message containing a code that is unique to the device or apparatus, wherein the message is generated periodically or in response to a deviation in the state by an XML processor that obtains new variables, on which a state is to be reported, from tag management software; and sending the message to an address of the remote computer registered with the apparatus, the HTTP command comprising a command that is configured to report the state of the apparatus using XML;

wherein the device is on an internal network and the remote computer is on an external network that is separate from the internal network, and wherein the remote computer cannot directly address the apparatus; and wherein the state of the apparatus comprises values of two or more variables associated with the apparatus, one or more of the variables being identified by an indicator because the one or more of the variables corresponds to an error condition associated with the apparatus.

31. A device associated with an apparatus for reporting a state of the apparatus to a remote computer, the device for executing instructions to perform operations comprising:

detecting the state of the apparatus;

generating a message that reports the state of the apparatus to the remote computer, the message comprising a HyperText Transfer Protocol (HTTP) command, the message using eXtensible Markup Language (XML) to report the state using variables, and the message containing a code that is unique to the device or apparatus, wherein the message is generated periodically or in response to a deviation in the state by an XML processor that obtains new variables, on which a state is to be reported, from tag management software; and sending the message to an address of the remote computer registered with the apparatus, the HTTP command comprising a command that is configured to report the state of the apparatus using XML;

wherein the device is on an internal network and the remote computer is on an external network that is separate from the internal network, and wherein the remote computer cannot directly address the apparatus; and wherein the state of the apparatus comprises values of two or more variables associated with the apparatus, one or more of the variables being identified by an indicator because the one or more of the variables corresponds to an error condition associated with the apparatus.

* * * * *

UNITED STATES PATENT AND TRADEMARK OFFICE
CERTIFICATE OF CORRECTION

PATENT NO.         : 8,898,294 B2                                              Page 1 of 1
APPLICATION NO.    : 13/251636
DATED              : November 25, 2014
INVENTOR(S)        : James R. Hansen It is certified that error appears in the above-identified patent and that said Letters Patent is hereby corrected as shown below:

Claims

Column 11, Line 27, In Claim 18, delete "The one or more machine-readable media of Claim 13," and insert --The one or more non-transitory machine-readable media of Claim 13,-- therefor.

Column 11, Line 45, In Claim 22, delete "The one or more machine-readable media of Claim 13," and insert --The one or more non-transitory machine-readable media of Claim 13,-- therefor.

Column 11, Line 49, In Claim 23, delete "The one or more machine-readable media of Claim 13," and insert --The one or more non-transitory machine-readable media of Claim 13,-- therefor.

Signed and Sealed this
Twenty-first Day of June, 2016

Michelle K. Lee
*Director of the United States Patent and Trademark Office*